United States Patent [19]
Adamson

[11] Patent Number: 6,072,282
[45] Date of Patent: Jun. 6, 2000

[54] FREQUENCY CONTROLLED QUICK AND SOFT START GAS DISCHARGE LAMP BALLAST AND METHOD THEREFOR

[75] Inventor: Hugh Patrick Adamson, Boulder, Colo.

[73] Assignee: Power Circuit Innovations, Inc., Boulder, Colo.

[21] Appl. No.: 08/982,975

[22] Filed: Dec. 2, 1997

[51] Int. Cl.[7] .................................................. H05B 41/16
[52] U.S. Cl. ........................ 315/276; 315/247; 315/291
[58] Field of Search ............................... 315/307, 209 R, 315/291, 224, 225, 276, DIG. 4, DIG. 7, 247, 248, 308

[56] References Cited

U.S. PATENT DOCUMENTS

| | | | |
|---|---|---|---|
| Re. 33,057 | 9/1989 | Clegg et al. | 315/224 |
| 3,919,595 | 11/1975 | Willis, Jr. | 315/257 |
| 4,100,476 | 7/1978 | Ghiringhelli | 315/297 |
| 4,134,044 | 1/1979 | Holmes | 315/209 R |
| 4,144,447 | 3/1979 | Eaton | 235/92 PE |
| 4,187,450 | 2/1980 | Chen | 315/278 |
| 4,414,491 | 11/1983 | Elliot | 315/282 |
| 4,453,109 | 6/1984 | Stupp et al. | 315/219 |
| 4,484,108 | 11/1984 | Stupp et al. | 315/219 |
| 4,630,005 | 12/1986 | Clegg et al. | 315/278 |
| 4,751,398 | 6/1988 | Ertz, III | 307/66 |
| 4,774,649 | 9/1988 | Archer | 363/20 |
| 4,888,527 | 12/1989 | Linberg | 315/282 |
| 5,047,696 | 9/1991 | Nilssen | 315/312 |
| 5,192,896 | 3/1993 | Qin | 315/224 |
| 5,371,440 | 12/1994 | Liu et al. | 315/209 R |
| 5,381,077 | 1/1995 | McGuire | 315/209 R |
| 5,416,387 | 5/1995 | Cuk et al. | 315/209 R |
| 5,461,287 | 10/1995 | Russell et al. | 315/209 R |
| 5,469,027 | 11/1995 | Uchihashi et al. | 315/224 |
| 5,471,118 | 11/1995 | Nilssen | 315/247 |
| 5,517,086 | 5/1996 | El-Hamamsy et al. | 315/247 |
| 5,519,289 | 5/1996 | Katyl et al. | 315/224 |
| 5,539,281 | 7/1996 | Shackle et al. | 315/224 |
| 5,648,702 | 7/1997 | Choi et al. | 315/224 |
| 5,850,127 | 12/1998 | Zhu et al. | 315/307 |

FOREIGN PATENT DOCUMENTS

| | | |
|---|---|---|
| 0 108 815 A1 | 5/1984 | European Pat. Off. . |
| 0 461 441 A1 | 12/1991 | European Pat. Off. . |
| 1 240 556 | 7/1971 | United Kingdom . |
| WO 93/01695 | 1/1993 | WIPO . |

*Primary Examiner*—Don Wong
*Assistant Examiner*—Wilson Lee
*Attorney, Agent, or Firm*—Homer L. Knearl; Merchant & Gould PC

[57] ABSTRACT

A gentle start electronic ballast operates one or more gas discharge lamps in a dimming or non-dimming mode. The ballast has a power supply section and a frequency-dependent control section. A power supply section includes a rectifier circuit, a power boosting circuit, a power factor compensation chip for the ballast, a control circuit to insure startup of the power factor compensation chip on the first haversine produced by the rectifier circuit and an in-rush current limiter that is removed from the operational circuit path of the ballast by the control circuit once the power factor compensation chip is rendered self-sustaining by the power boosting circuit. The control section receives power from the power supply section creating a reference voltage that is applied to a voltage controlled oscillator to develop an output signal the frequency of which varies from an initial high value to a lower operating value through a range that corresponds with the permissible range of power to be applied to the lamps and separately to their filaments as determined by the values of elements employed in a frequency adjustment circuit that is coupled to the oscillator. The output oscillator's signal is thereafter applied to a current limiting, shunted transformer having an air gap and turns ratio that is selected in accordance with the load profile and operating characteristics of the gas discharge lamps to ultimately apply power to the lamps as a function of the frequency of the signal applied to the transformer.

57 Claims, 13 Drawing Sheets

| FIGURE 2A | FIGURE 2B |
|---|---|
| FIGURE 2C | FIGURE 2D |

FREQUENCY CONTROLLED QUICK AND SOFT START GAS DISCHARGE LAMP BALLAST AND METHOD THEREFOR

BACKGROUND OF THE INVENTION

1. Field of the Invention

The present invention relates to an electronic ballast for controlling gas discharge lamps and, more particularly, to a frequency controlled ballast with power supply circuitry which limits in-rush current while assuring rapid, but soft ballast start and methods for controlling gas discharge lamps.

2. Description of the Prior Art

A gas discharge lamp, such as a fluorescent lamp, represents a complex load for a power source because the current drawn by the lamp is dependent upon the lamp's condition, conducting or non-conducting, and the electrical nature of the elements used in its accompanying ballast. In addition to the usual problems associated with controlling an electrical load, control of a fluorescent lamp or group of lamps is made more difficult by factors such as safety requirements, fluctuating line voltages, power factor requirements, electrically generated noise and efficiency considerations.

A gas discharge lamp presents a non-linear or variable load to a power source since the lamp requires that a minimum voltage across the lamp be reached before it will conduct and draw current through the lamp. "Instant start" ballasts and lamps rely on a high initial voltage (over 400 volts) to trigger discharge between unheated lamp electrodes. "Rapid start" ballasts and lamps rely on a low, preheating voltage supplied to the electrodes for approximately 2 seconds followed by a starting voltage that is typically between 200 and 300 volts which strikes the starting arc within the lamp. Regardless of its type, once the lamp turns on and conducts, the current it draws will rapidly increase unless a load is placed in series with the lamp to limit and stabilize the lamp current.

Early prior art true resistive ballasts provided the appropriate current limiting function, but consumed too much power and, as result, pulled down the ballast's operating efficiency. Magnetic or inductive based ballasts which followed improved overall efficiency somewhat, but the heavy weight and bulk of large inductors that were required because of the low input power frequency range of from 50 to 60 hertz, and the associated inductor core and copper losses, caused inductor based ballasts to lose favor and be overtaken by electronic ballasts.

Modern electronic ballasts offer improved operating efficiency and control functions not usually found in early ballasts. They typically provide a power conditioning circuit and a control circuit which insure sufficiently high voltage to initiate glow discharge within the lamps and an impedance to counteract the negative resistance properties of the glow discharge and filament heater current to promote rapid start. The power circuit usually includes a rectifying capability to change input alternating current (typically 50 to 60 Hertz and from 90 to 300 volts AC) to a form of direct current, a "boost" circuit to raise the inverted DC voltage levels to the operating levels needed by the lamps and an inverter function to convert the rectified direct current to alternating current at higher frequencies (typically 20 to 60 kilohertz which reduces the size of the inductors used). Very often, the boost circuitry, which can be of the driven, self-triggering or oscillating type, includes a power factor or conditioning circuit that attempts to maintain the operational load presented by the ballast to the power line as close to unity (a pure resistive load) as operating conditions permit.

U.S. Pat. No. 5,461,287 to Russell et al, entitled BOOSTER DRIVEN INVERTER BALLAST EMPLOYING THE OUTPUT FROM THE INVERTER TO TRIGGER THE BOOSTER, is an example of a modern electronic ballast wherein a triggered boost circuit, a driven inverter and a low voltage signal generator are used to power the lamp control circuit. In the event of a fault, the operation of the signal generator is interrupted thereby shutting off the boost circuit and the inverter.

Another prior art ballast example of this type will be found in U.S. Pat. No. 5,591,289 to Katyl et al, entitled ELECTRONIC BALLAST WITH LAMP CURRENT CORRECTION CIRCUIT, wherein a frequency dependent, regulated power supply, a power oscillator/driver circuit, power factor correction circuit and a feedback circuit are combined in an electronic ballast to maintain constant current in the ballast regardless of the number of lamps controlled by the ballast. The power circuit correction circuit is turned on through a resistor connected to the power supply.

U.S. Pat. No. 5,471,118 TO Nilssen, entitled ELECTRONIC BALLAST WITH POWER-FACTOR-CORRECTING PRE-CONVERTER, is directed to a ballast that features an FET implemented full wave bridge rectifier combined with a boost circuit and power factor correction pre-converter.

Another electronic ballast described in U.S. Pat. No. 5,416,387 to Cuk et al, entitled SINGLE-STAGE, HIGH POWER FACTOR, GAS DISCHARGE LAMP BALLAST, seeks to increase ballast efficiency and reliability while reducing size and cost by utilizing circuitry that combines a ballast's usual power conversion stages into a single stage. One feature of this arrangement is its claimed suitability for both instant and rapid start type lamps.

One of the common characteristics of prior art electronic ballasts is that their starting operational requirements are hard on the lamps and cause shortened life as well as other operating deficiencies, such as, for example, wasted power, too much or too little light output or inefficient power usage. In addition, prior art dimming electronic ballasts employed pulse width modulation techniques that required power consuming additional circuitry to "clean" up resulting voltage ripples caused by the pulse width modulation.

Moreover, many available prior art electronic ballasts with power factor correction circuits, like some of those identified above, cannot be guaranteed to start on the first haversine produced by their rectifier circuits. This delay in turn-on of the ballast, of necessity, adds delay to the time it takes to start the lamps it controls, even for so-called rapid start or instant-on lamps.

It is, therefore, a primary object of the present invention to provide an electronic ballast for gas discharge lamps that is dependent upon frequency control.

It is also an object of the present invention to provide an electronic ballast that started as quickly as possible, specifically on the first half-cycle of power available to it.

It is also an object of the present invention to have such a quick starting ballast function in cooperation with its power factor compensation circuitry while still limiting in-rush current.

A further object of the present invention is to provide initial input power to a ballast's power factor compensation or correcting circuitry and thereafter maintain such input power in an efficient manner, preferable by removing the in-rush current circuit from the ballast's operational path after starting, when it is not needed, thereby avoiding the loss of power it would otherwise consume.

It would also be an object of the present invention to provide lamp functions, such as dimming and fast lamp turn-on, in a universal ballast that handled all of the foregoing requirements correctly under the different ranges of input voltage and frequency provided in different regions of the world thereby yielding manufacturing economies of scale, lowering cost and reducing inventory requirements for vendors and distributors of electronic ballasts. Thus, modern lamp control circuitry or electronic ballasts, are presented with a myriad number of functional requirements and operating conditions that have resulted in various prior art solutions.

Still another object of the present invention is to accomplish the foregoing over the worldwide range of expected voltages and frequencies without interfering with the control aspects of the ballast in which it is employed.

SUMMARY OF THE INVENTION

The foregoing objects are achieved by the present invention in a frequency controlled electronic ballast for supplying power to one or more gas discharge lamps, which ballast includes in various combinations and embodiments, a rectifier circuit to convert received AC power to a form of DC voltage, a boosting circuit for increasing the level of the DC voltage to an AC equivalent and level suitable for the lamps, a power factor correction circuit for adjusting power drawn by the ballast close to unity which is turned on in the first half cycle of operation, voltage regulating circuits for adjusting the converted DC signal to predetermined reference voltages, a voltage controlled oscillator circuit for generating an output signal whose frequency is a function of a received reference voltage and a regulated transformer circuit that receives a reference signal and transforms it as a function of the frequency of the reference signal to an appropriate operating lamp power level.

In alternative aspects of the present invention, a ballast according to the present invention is provided with either dimming or non-dimming capability. Further, provision is also made for separately providing frequency controlled, soft start for the lamps through the provision of sweep in power to their filaments. This approach to starting gas discharge lamps works equally well with both instant and rapid type lamps.

In addition, the foregoing objects are also achieved by the methodology of the present invention which provides a frequency controlled electronic ballast for supplying power to one or more gas discharge lamps, which methods provide the ballast with various combinations and embodiments of a rectifier circuit to convert received AC power to a form of DC voltage, a boost circuit for increasing the level of the DC voltage to an AC equivalent and level suitable for the lamps, a power factor correction circuit for adjusting power drawn by the ballast lose to unity which is turned on in the first half cycle of operation, voltage regulating circuits for adjusting the converted DC signal to predetermined reference voltages, a voltage controlled oscillator circuit for generating an output signal whose frequency is a function of a received voltage and a regulated transformer circuit that receives a reference signal and transforms it as a function of the frequency of the received voltage to an appropriate operating lamp voltage and power level.

BRIEF DESCRIPTION OF THE DRAWINGS

A more complete understanding of the present invention can be obtained by considering the following detailed description of the preferred embodiments thereof in conjunction with the accompanying drawings, in which:

FIG. 2 is a schematic diagram of a dimming electronic ballast in accordance with the present invention suitable for use with rapid start, instant start or another type of gas discharge lamp, wherein FIG. 2 is divided into four Figures, FIG. 2A, FIG. 2B, FIG. 2C and FIG. 2D for clarity.

FIG. 4 depicts a schematic diagram of a non-dimming electronic ballast in accordance with the present invention suitable for use with rapid start, instant start or another type of gas discharge lamp, wherein FIG. 4 is divided into four Figures, FIG. 4A, FIG. 4B, FIG. 4C and FIG. 4D for clarity.

DESCRIPTION OF THE PREFERRED EMBODIMENTS

Figure 1:
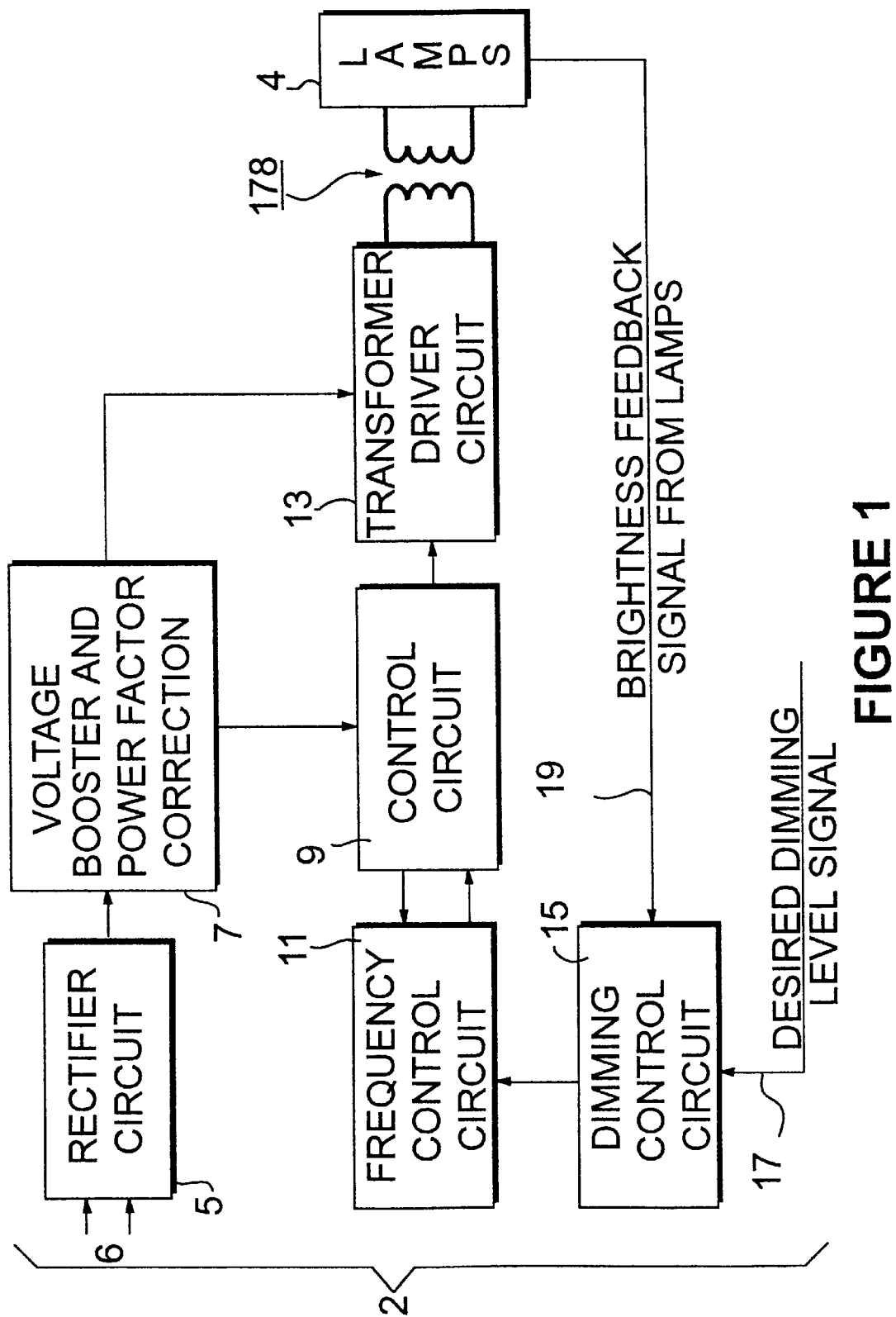
FIG. 1 is a block diagram of the main functional elements of the present invention representing an electronic dimming ballast.

Referring now to the drawings wherein like reference numerals have been used in the several views to identify like elements, FIG. 1 illustrates a block diagram of an electronic dimming ballast 2 in accordance with the present invention. A line voltage source 6, having a frequency and voltage level normal for the specific location of the world at which the ballast is being used, that provides power to the ballast 2. The supplied voltage is rectified by circuit 5 to a continuous series of haversines, see FIG. 3, and passed on to a voltage booster and power factor correction circuit 7. The circuit elements of block 7 serve to raise the voltage level to a self-sustaining value appropriate for control circuit 9 and the gas discharge type of lamps 4 being used. Control circuit 9 forwards a reference voltage signal to the frequency control circuit 11, which adjusts the frequency of its output in accordance with that reference, subject to any changes in that output frequency called for and required by the dimming control circuit 15 though its desired dimming level signal 17. As shown in FIG. 1, the dimming control circuit 15 also receives a brightness feedback signal 19 from the lamps 4 which it compares to the desired dimming level signal 17 to derive a differential signal, whenever signals 17 and 19 are different, that is used to adjust the frequency of the voltage output by frequency control circuit 11.

The output from frequency control circuit block 11 is fed to control circuit 9 where it is used to produce a closely matched square wave voltage that is forwarded to transformer driver circuit 13. The transformer driver(s) thereby created in block 13 are used to a generate driver for a special transformer 178, to be described hereinafter in greater detail, that is coupled to the lamps 4 whereby power is delivered to the lamps 4.

Figure 2A:
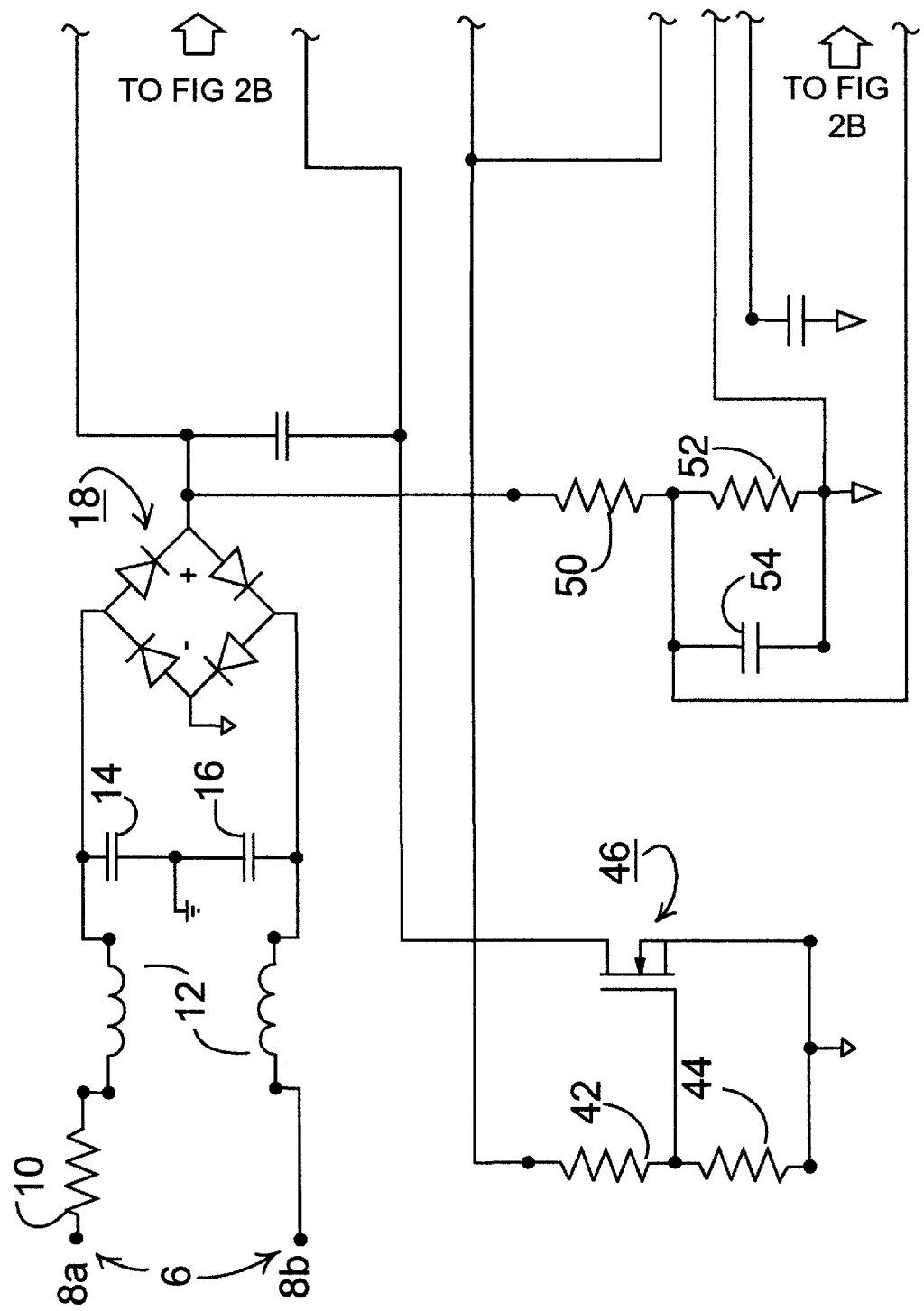

FIG. 2, i.e, FIGS. 2A–D illustrates in greater detail the components of a dimming electronic ballast 2 used for coupling a set of fluorescent lamps 4 to the source of electrical power 6 at input terminals 8a and 8b (FIG. 2A). The power source in this instance is 120 volts AC at a frequency of 60 hertz, the standard power conditions found in the United States. The depicted ballast 2, however, can accept input voltages in the range of 90 to 300 volts AC at frequencies of 50 to 60 hertz or DC in the range of 140 to 450 volts. This permits an electronic ballast made in accordance with the present invention to function satisfactorily, in full accordance with its specifications, in any country in the world under most power conditions that will be encountered.

Resistor 10 is connected in series with input terminal 8*a* and serves as a fuse or current limiting device. Resistor 10 represents a simple way to protect against overloads or excessive transients that would otherwise harm the ballast or compromise safety. Inductor 12 and capacitors 14 and 16 form an electromagnetic interference (EMI) or common mode choke filter that reduces EMI conducted to terminals 8*a* and 8*b* by limiting high frequency signals and passing only signals that have a complete path through the ballast 2.

Figure 2B:
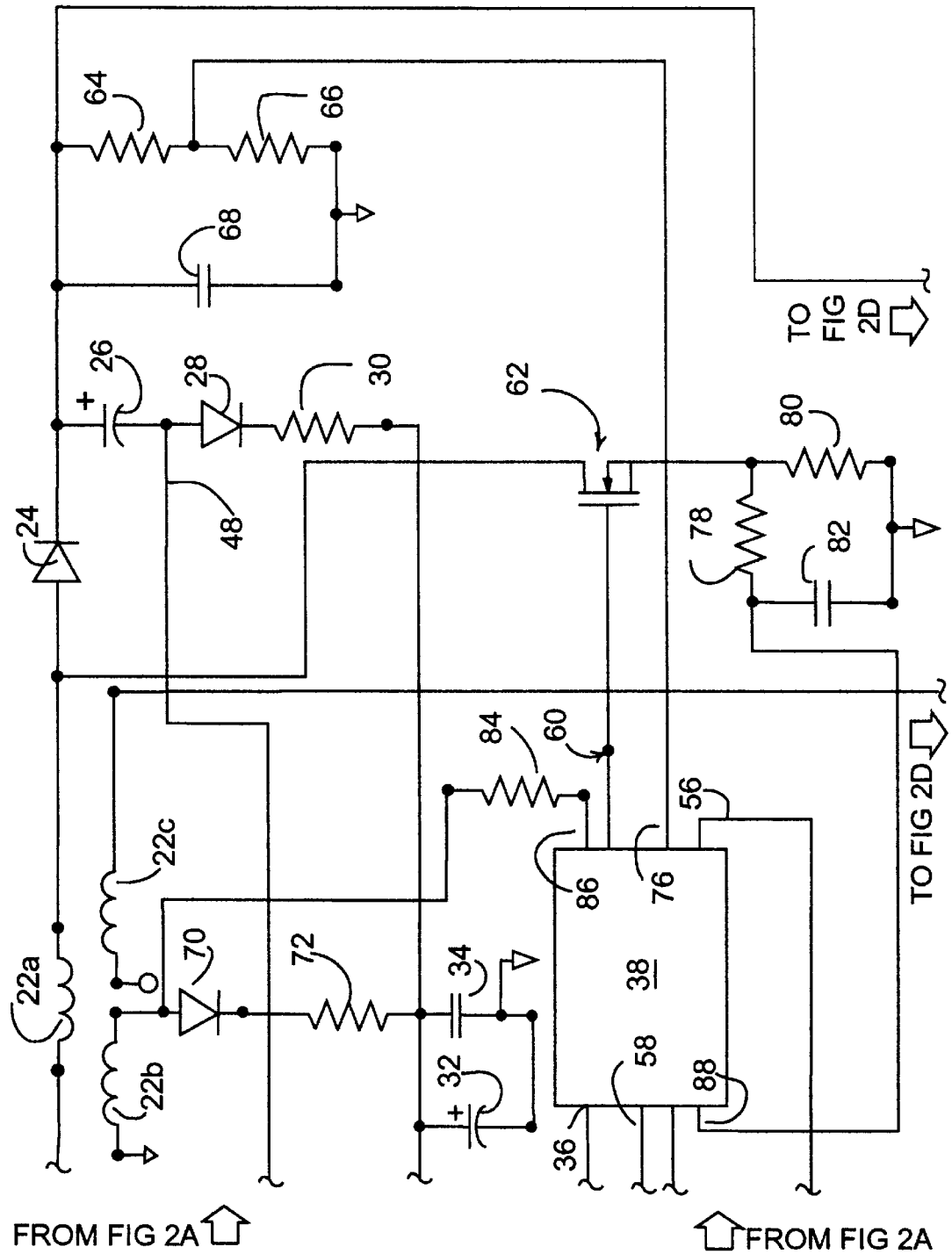
Figure 2C:
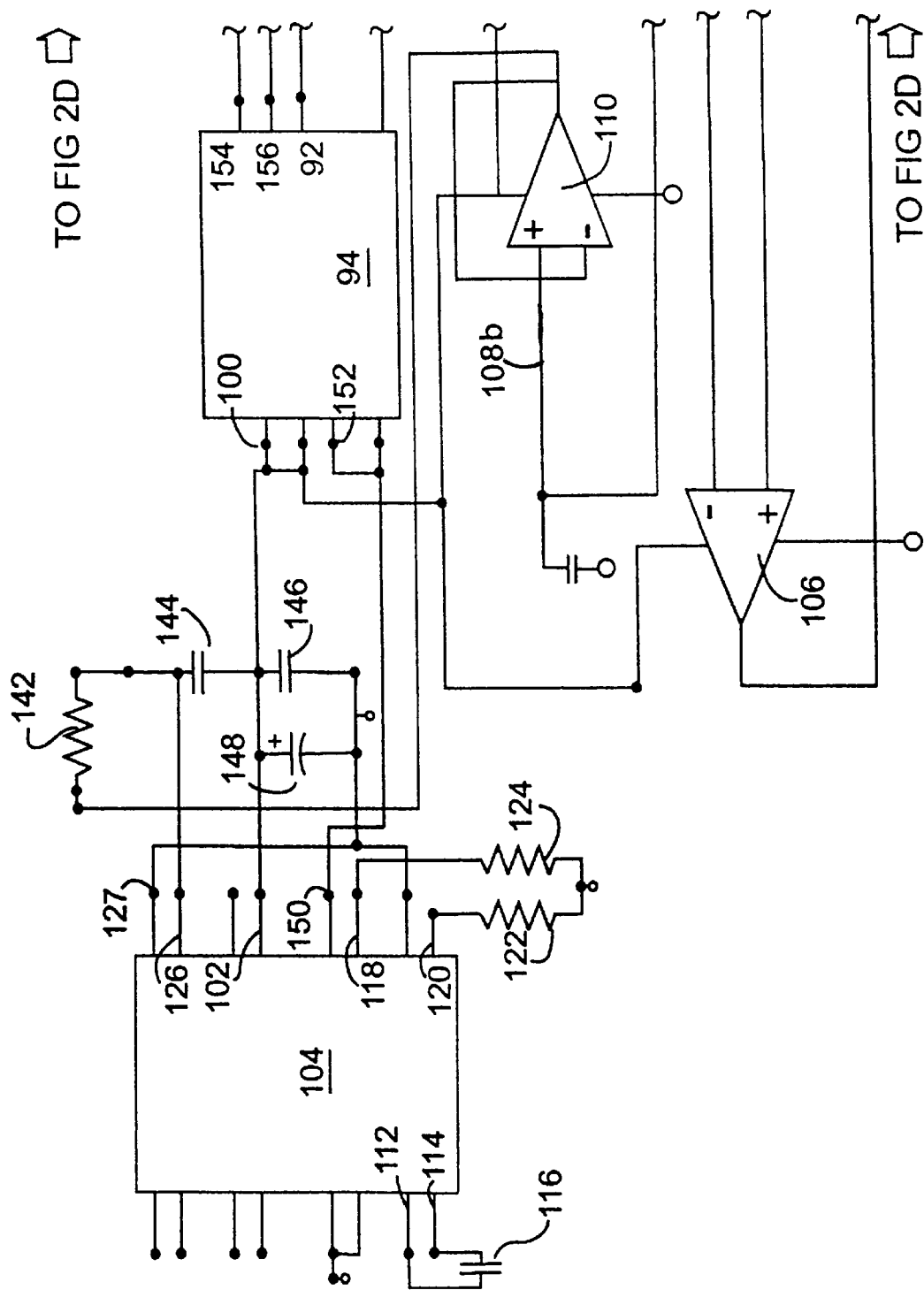
Figure 3:
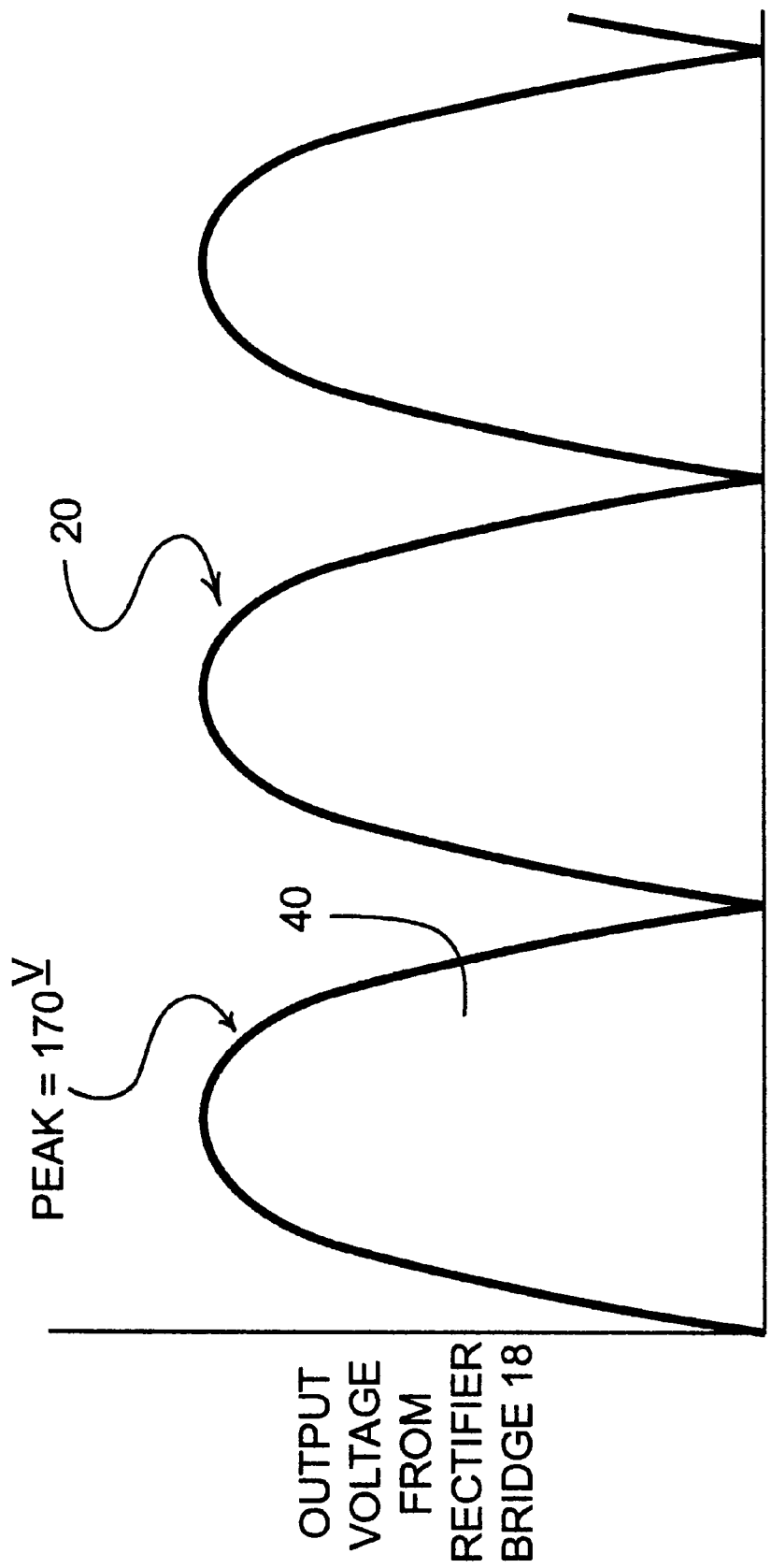
FIG. 3 illustrates the output voltage haversines obtained from a full wave rectifier bridge utilized in the electronic ballast shown in FIG. 2A.

Full wave rectifier bridge 18 converts the input signal in standard fashion into the rectified output voltage signal 20 as shown in FIG. 3. The output voltage 20 of bridge 18 passes through several paths, the first including boost choke 22*a*, diode 24 which provides power to output FETs 158 and 160, as will be discussed hereinafter, capacitor 26, resistor 30, diode 28 and capacitors 32 and 34 (FIG. 2B). Capacitors 32 and 34 are connected to input pin 36 of power factor chip 38.

Power factor chip 38 is a Motorola MC33262 integrated circuit chip which is more fully described at pages 3-455 to 3-457 of Motorola's Analog/Interface ICs, Device Data, Volume 1, Revision 5, 1995. Integrated circuit chip 38 is a high performance, current mode power factor controller that is designed to enhance poor power factor loads by keeping the AC line current sinusoidal and in phase with the line voltage. Proper power factor control keeps the apparent input power phase to ballast 2 close to that of the real power it consumes thereby increasing the ballast's operating efficiency in that respect.

When power is turned on, the first half-cycle or haversine 40 thereof output by bridge 18, see FIG. 3, reaches a value of 170 volts peak with an input voltage of 120 volts rms. Capacitors 26, 32 and 34 are initially discharged. Capacitors 26 and 32, when discharged appear shorted and when subjected to the initial haversine in an AC circuit, act as a voltage divider as determined by their respective capacitive values, for the initial haversine 40. In this instance, if the value of capacitor 26 is selected to be 24 microfarads and the value of capacitor 32 is chosen to be 48 microfarads, then capacitor 26, in the absence of other limits, would have two thirds of the peak of voltage 20 or 113.3 volts impressed across it and capacitor 32 would have one third of voltage 20 or 56.7 volts impressed across it. If the input voltage is as low as 90 volts, the voltage across capacitor 32 is still more than 30 volts, which is sufficient to turn on power factor chip 38. At the same time, resistor 30 limits the in-rush current to capacitor 26. As a result, the voltage division previously referred to across capacitors 26 and 32 actually occurs between capacitor 26, resistor 30 and capacitor 32, with resistor 30 serving the dual function of also limiting in-rush current on the first-half cycle. Capacitor 34 would have little effect on the voltage divider aspects of capacitors 26 and 32 since it is very small in value compared to capacitors 26 and 32.

Ordinarily, one third of the peak of voltage 20, a voltage of 56.7 volts in this instance, across capacitor 32 would be more than sufficient to burn it out. However, the combination of resistors 42 and 44 with FET 46, as shown in FIG. 2A, imposes a pre-set voltage limit across capacitor 32, which also protects IC chip 38. The values of resistors 42 and 44 are selected to have the voltage limit across capacitor 32 set to 15 volts in this instance. When the voltage across capacitor 32 exceeds its preset limit, FET 46 turns on pulling its base and line 48 to ground. Since line 48 is connected to one side of capacitor 26 and the base of diode 28, when line 48 goes to ground, capacitor 26 acts as an open circuit to further haversines and becomes a filter capacitor to the high DC voltage to power FETs 158 and 160. At the same time diode 28 is back biased thereby eliminating the further flow of current through diode 28 and resistor 30 and preventing capacitor 32 from being charged above its preset limit of 15 volts. This is true regardless of the value of input voltage in its nominal range of 90 to 300 volts AC, 50 to 60 Hertz.

In this manner, the circuit arrangement described above limits the total in-rush current at an input of 120 volts, where the voltage and current are 90 degrees out of phase with each other, the worst case, to 4.3 amps at an input of 120 volts AC. At the same time, the circuit insures that the appropriate voltage is applied to pin 36 of the power factor chip 38 to start it without ongoing loss of power even when the input voltage is at lowest expected value, in this case 90 volts AC. Further, even at this lowest possible input voltage, the circuit elements cooperate to provide an "instant on" capability for the power factor chip which gets turned on in the first half cycle of power over an input voltage range of 90 to 300 volts AC.

By way of comparison, the prior art method of using a resistor connected between the output of a ballast's power supply and the voltage supply pin of a power correction circuit, such as IC 38, would require a design tradeoff between power loss and turn on time over the expected input voltage range of 90 to 300 volt AC. For example, a 100k ohm resistor connected to rectifier bridge 18 and across capacitor 32 at 300 volts AC input would cause a current of about 4 milliamps, draw about 0.9 watts and take approximately 0.25 seconds to charge capacitor 32 to the minimum level required to start IC 38. On the other hand, the same 100k ohm resistor at 90 volts AC input would draw only 80 milliwatts, but take almost 2.0 seconds to turn on IC 38. As will be explained hereinafter, the availability of voltage to turn on the lamps is dependent upon operation of the power circuit chip 38. The longer IC 38 takes to turn on, the longer it takes for the lamps to be illuminated.

Further, if the power factor chip is initially turned on by connecting a resistor from the output of a full wave rectifier bridge or other DC source to the chip's input pin and a capacitor, such as capacitor 32, that resistor continues to dissipate wattage even when it is not needed after IC 38 is started. This usually wastes, depending on the size of the resistor selected, from approximately 80 milliwatts to 900 milliwatts and while that seems low when compared to other electronic devices, the overall saving in a setting where many lamps and ballasts are used, such as in a parking garage or large warehouse with hundreds of lamp fixtures, provides a considerable cost saving.

It is important to note that once appropriate power to chip 38 is provided, FET 46 is turned on as explained above, and as a result, diode 28 and resistor 30 are removed from the active circuit path. Since current is now supplied on a boost basis through coil 22*b*, diode 70 and resistor 72 to capacitor 32, resistor 30 isn't needed and the lack of current flow therethrough avoids power waste. The net effect is that resistor 30 is used during the first half cycle of operation to limit in-rush current and act as part of a voltage divider until FET 46 conducts after which it is effectively removed from the operational portion of the ballast's power supply circuit.

In addition, since the time constant of the resistor/capacitor combination at input pin 36 limits voltage buildup across the capacitor and to the input pin, it takes longer for the voltage across that capacitor to reach an appropriate level to turn on the power factor chip and the ballast. Conversely, the above-described circuit elements of the present invention insure that the ballast is turned on in the first half cycle of operation, especially for lower than usual input voltages, while that is not true in the prior art.

Once initiated, IC chip 38 is made self-supporting through the combined effects of associated circuit elements which use the output voltage 20 from rectifier bridge 18 to power chip 38 and the ballast control circuitry along with the lamps 4 with IC chip 38 serving to maintain the load power in phase with the input power. This is accomplished by forcing an inductive kick to occur in choke 22a, and derivatively in its secondary coil 22b, in phase with the haversines available at the output of full wave rectifier bridge 18. It should be noted that the IC chip 38 will shut down with no load because there will be no sustaining DC voltage.

The output voltage 20 from bridge 18 is passed to resistors 50 and 52, which form a voltage divider, and partially to capacitor 54 which helps filter voltage applied to input pin 56 of IC chip 38. Input pin 58 of IC chip 38 is held at ground. By appropriate choice of resistor values for resistors 50 and 52, the voltage on pin 56, which is in phase with the haversines of bridge output voltage 20, is typically set at around 2 volts peak. Internal to chip 38, that voltage is passed through a drive circuit (not shown) to appear on output pin 60. That voltage is applied to the gate of FET 62 and turns FET 62 on whenever the appropriate voltage level is reached during each haversine.

When FET 62 (FIG. 2B) turns on, it very quickly pulls the right side of coil 22a to ground, and when it releases, causes an inductive kick in coil 22a and a reflective inductive kick in coil 22b, both of which are in phase with the haversines derived from the input power line. The induced voltage level is determined by the voltage divider formed by resistors 64 and 66. In this application, the values of resistors 64 and 66 are selected to produce a total value of 435 volts on capacitor 26. The total voltage is the result of the bridge output voltage 20 and the voltage resulting from the inductive kick in coil 22 for the time period that FET 62 is turned off. The 435 volts charge capacitors 26 and 68 to that level in phase with the input line voltage, or nearly so with the variance being approximately one degree out of phase. Capacitor 68 also serves as a high frequency filter.

Feedback from the junction of resistors 64 and 66 is provided to input pin 76 of IC chip 38 as a reference voltage Vset which is used to inform the internal circuitry of IC chip 38 that the correct DC voltage has been reached. When that occurs, the drive voltage is removed from pin 60 and FET 62 is permitted to turn off until the next haversine is present.

Since capacitor 26 may be drained when the ballast 2 is loaded, the resultant 435 volts is also used via feedback to keep IC chip 38 powered on as well as to provide power to the remainder of the ballast 2 and to the lamps 4. Feedback power to IC chip 38 is provided by coil 22b, through diode 70 and resistor 72 to capacitors 32 and 34. Capacitor 32 applies power to input pin 58 of IC 38 as previously described through the voltage limiting combination of resistors 42 and 44 and FET 46. Diode 70 and resistor 72 are inserted in the path from coil 22b to capacitors 32 and 34. Diode 70 serves to prevent discharge from capacitors 32 or 34 from causing unwanted current flow into coil 22b while resistor 72 serves to limit current in that circuit leg to capacitors 32 and 34 and acts as a filter in conjunction with capacitors 32 and 34 for pin 58.

The combination of resistors 78 and 80 and capacitor 82 serve to protect FET 62 by limiting and filtering the current signal drawn when FET 62 turns on. Resistor 80 is selected to have a low value, typically a few tenths of an ohm. Drive voltage is supplied to output pin 88 and resistor 80 serves to limit that to a current value that can easily be tolerated by FET 62. In addition, the voltage drop across resistor 80 determines the level at which FET 62 is turned off since it provides a delay that results from its RC combinational effect with capacitor 82. In addition, resistor 78 and capacitor 82 provide a high frequency filter capability for current flowing to pin 88.

On balance, the net effect of the front end portion of ballast 2 is to provide a precision, high voltage DC power supply with power factor compensation for an electronic ballast that turns on in its first half cycle of operation at reduced power consumption even when the input voltage level is at its lowest expected value. The front end portion also features a limited in-rush current capability that is automatically removed from the operational portion of the circuit thereby conserving power. The front end ballast portion also provides isolated control circuit power. In fact, the use of transformers to power the lamps 4 insures that there is no direct electrical connection from the input power source to the control circuit or the output (the lamps).

Current flowing through coil 22a causes current to flow in secondary coil 22c by transformer action. When coil 22a experiences the previously described inductive kick, a like and proportional increase in current flow is experienced in coil 22c. By selecting an appropriate turns ratio between coils 22a and 22c, the induced voltage in coil 22c can be set to any desired level. In this case, that level can be as low as 14 volts and as high as 40 rectified volts DC, depending on the contribution of the inductive kick to voltage generated in coil 22c and the load being driven by the ballast 2. As indicated by the dots in FIG. 2 alongside coil 22a, 22b and 22c, their phases are chosen accordingly.

The power for the control circuit portion of ballast 2 is derived from coil 22c and passes through diode 90, (FIG. 2D) which prevents reverse current flow into the front end portion of ballast 2, to input pin 92 of integrated circuit chip 94, a Texas Instruments TPS2813 multi-function chip. The voltage is filtered for high frequency by capacitors 96 and 98. Input pin 92 serves as the input to an internal voltage regulator in IC chip 94. The output of that regulator is pin 100 which is held at a constant value of 11.5 volts by the regulator's action over the range of the 14 to 40 volts which appears on input pin 92. Output pin 100 is connected to input pin 102 of the CMOS integrated circuit chip 104, an RCA voltage controlled oscillator. Output pin 100, in the dimming version of ballast 2, is also connected to operational amplifier 106 (FIG. 2C), an LMC6032.

Control of IC chip 104 (FIG. 2C) is based on the capacitive value of capacitor 116 which is connected across pins 112 and 114 of IC chip 104 and the values of resistors 122 and 124. The value of resistor 122 determines the lower frequency operating limit of IC chip 104 while the value of resistor 124 determines its upper frequency limit. The voltage on input pin 126 determines the operating frequency of the output voltage, a DC square wave, on pin 150 of IC chip 104. If the voltage on pin 126 is zero volts, the output on pin 150 oscillates at its lowest frequency as determined by resistor 122. If the voltage on pin 126 reaches it highest value, then the output on pin 150 of chip 104 oscillates at its highest possible frequency as set by resistor 124.

As noted above, the values of capacitor 116 and resistors 122 and 124 determine the minimum to maximum frequency range of response for chip 104. If the voltage on pin 126 is zero volts, for example, then the values of resistor 122 and capacitor 116 determine the minimum frequency of the voltage on pin 150. If the voltage on pin 126 reaches its maximum value of $V_{CC}$, the voltage on pin 102, then the values of resistor 124 and capacitor 116 determine the maximum frequency of the square wave present on pin 150. Further, it should be recognized that the frequency control range is linear, that is, for example, a 10% change in voltage on pin 126 will produce a 10% change in the frequency of the voltage on pin 150. Alternatively stated, the values of resistors 122 and 124 also determine the slope of the frequency range from its minimum to maximum values.

A set of matched resistors 128 is coupled between operational amplifiers 106 and 110 and a dimming reference voltage source 130 that is comprised of current sensing coil 132, resistor 134 and diode 136. Resistor set 128 is a set of equivalent valued resistors that are matched to a tolerance of 50 parts per million which creates a very good differential amplifier when used in conjunction with amplifiers 106 and 110. As used with resistor set 128, the resultant differential amplifiers 106 and 110 have a very high common mode rejection ratio which is important since the lines going out to the dimming control may run long distances and the resulting voltage variations, if slight, will need to be accounted for by the ballast control circuitry.

Figure 2D:
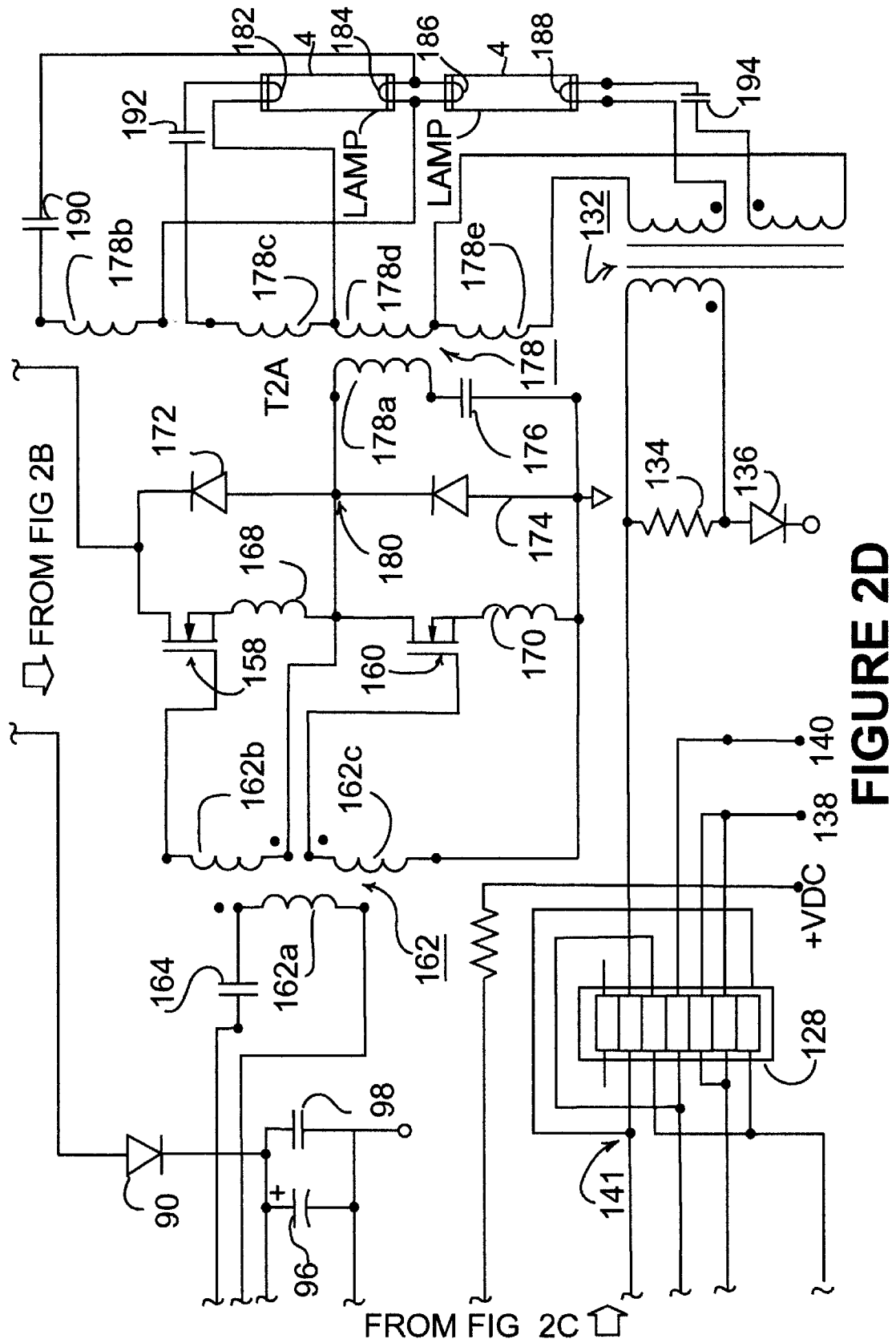

Voltage from a dimming switch (not shown) that is located near the lamps to be controlled, is applied across terminals 138 and 140 (FIG. 2D). That voltage is applied through resistors in set 128 to the inputs of differential amplifier 106. The output of amplifier 106 is fed, again through one of the set 128 resistors to a summing point 141 and from there to the positive input 1 of differential amplifier 110. At the same time, a reference current induced by current in the high voltage lines to one of the lamps 4, which is on or illuminated, is derived by transformer action in coil 132 and forwarded to a resistor in set 128 and the resultant voltage is also passed to summing point 141 and input 108b of amplifier 110. The actual voltage on input pin 108b is, in this case, the average of the dimmer voltage and the lamp reference voltage as derived from coil 132. If the dimmer voltage is assumed to be 3 volts and the lamp reference voltage is assumed to be 3.5 volts, then the average voltage is 3.25 volts and that is what is applied to input 108b of amplifier 110.

The output of amplifier 110 (FIG. 2C) is fed through resistor 142 to input pin 126 of chip 104 thereby changing the voltage on pin 126 and the operating frequency of the voltage on output pin 150. This will cause a change in the voltage applied to and the brightness of the lamps 4, raising or lowering the reference current developed in coil 132 as desired. When the brightness called for by the voltage across terminals 138 and 140 is reached, the output of differential amplifier 110 no longer changes from the value called for by the dimmer and pin 126 is then left at a constant voltage. In the above example, this would mean that the voltage from the dimmer is at 3 volts and the lamp reference voltage is also 3 volts. That makes their sum 3 volts which holds pin 126 of chip 104 constant, that is, until a change in brightness is called for.

The importance of the negative feedback action of the lamp reference current is that the control system places the appropriate voltage on all lamps to create the brightness called for by the dimmer regardless of variations from ballast to ballast or dimmer switch to dimmer switch. In essence this means that you want the same current in each lamp being controlled by a single ballast in response to the feedback resulting from the sum of the dimmer voltage and the reference voltage. This removes the effects of component variations from ballast to ballast and predicates lamp brightness under dimmer control on responsiveness to the current feedback from coil 132 as summed with the dimmer voltage.

At start-up or turn-on, capacitor 144, which is connected across pins 100 and 126, is discharged. When pin 100 comes up to its steady state or regulated voltage of 11.5 volts, capacitor 144 pulls pin 126 to the regulated voltage. Capacitor 144 is then charged to the regulated voltage of pin 100 by resistor 142 and the output of amplifier 110. This causes the ballast to sweep in from the highest frequency at start-up to a lower frequency as represented by the output voltage of amplifier 110. The lamps like this methodology because they ionize better at higher frequencies and the lower currents produced by transformer 162. Essentially, this is a soft or gentle start for the lamps which preserves their fluorescent coatings and promotes longer lamp life.

Capacitor 144, once charged, also serves as part of a low frequency filter for the control system as connected between the output of amplifier 110 and resistor 142 with resistor 142 to handle brightness switching transients. For example, when the dimmer control voltage is changed by a user, the output of amplifier 110 changes almost instantaneously. Similarly, if the lamp reference current developed in coil 132 changes, the output of amplifier 110 also changes almost instantaneously. If the control system were to respond as quickly as it ordinarily might to such changes, the lamps would flicker or flutter until the desired brightness was reached. To avoid this problem, capacitor 144, once charged, and resistor 142 form an RC circuit which imposes a time delay on the signal applied to pin 126 and thereby smoothes the brightness transitions. Thus, the combination of capacitor 144 and resistor 142, depending on where the control circuit is in the operating cycle can act as a low pass filter when running or as a differentiator at start-up.

The square wave voltage output of chip 104, as previously noted, is dependent on the voltage at pin 126. At initiation, pin 126 is relatively high and thus the frequency of the voltage at pin 150 is also high. Pin 150 goes to input pins 152 of chip 94. Internal to chip 94 are two buffers which place an output voltage on each pins 154 and 156 of chip 94. These outputs are of the same frequency, but shifted 180 degrees out of phase with each other. This has the effect of doubling the voltage across the primary winding 162a of pulse transformer 162 (FIG. 2D). The internal buffers of chip 94 are driven by powerful drivers that are capable of providing pulsed current flow in the order of 2 amps into capacitive loads, the kind exhibited by a FET. This capability permits a relatively weak signal to be boosted so that the power FETs 158 and 160 can be turned on very quickly. This has the effect of minimizing transition losses, which are dependent on how fast the power FETs are turned on (in this application in approximately 40 nanoseconds). The FETs are selected to have the lowest possible "on-resistance" or impedance so that power losses through the FETs and in the ballast are kept to a minimum. Finally, chip 94 acts as a buffer between the low power CMOS implemented voltage control oscillator chip 104 and the power FETs 158 and 160.

The outputs from driver pins 154 and 156 are a set of very closely matched square waves whose edges are within 40 nanoseconds of each other with high pulsed drive (2 amp) capacity. The AC coupling effect of capacitor 164 permits the low impedance primary inductor 162a to be effectively connected to output pins 154 and 156. With this output, the control circuit will drive the primary side of closely coupled pulse transformer 162a, the signal amplitude of which is effectively doubled at secondary transformer windings 162b and 162c to plus and minus 11 volts by the out of phase output from pins 154 and 156. This effectively puts a 22 volt square wave across primary 162a. On the secondary side of transformer 162, this means that power FET 158 will have plus 11 volts applied across its gate and source while power FET 160 will have minus 11 volts applied across its gate and source. Since the FETs are selected with optimized values of minimal on-resistance when gate to source voltage is greater than plus 5 volts and off-resistance is maximal when gate to source voltage is less than minus 5 volts, they are each turned on and off very quickly by the plus and minus 11 volts applied across their respective gate and source by the secondary windings 162*b* and 162*c* respectively. This guarantees that the power FETs 158 and 160 are turned on and off very quickly which minimizes transition losses.

The secondary windings 162*b* and 162*c* are out of phase with each other by 180 degrees guarantying that the gate to source voltages generated therein that turn the power FETs on and off will also be out of phase by that amount. However, the edges of the generated voltages are so sharp and fast that there is a possibility that the FETs could be on at the same time, even if briefly, permitting the 450 volts present at point 166 to be conducted to ground. That would be unsafe and undoubtedly cause a problem in the ballast or pose a threat to a user. Accordingly, inductors 168 and 170 are connected from one side of each secondary winding to the source of the associated FET, as shown in FIG. 2, to impose a slight delay and thereby establishing a safe zone and insuring that the power FETs 158 and 160 are not on at the same time.

The center point of the power FETs 180 is connected to the primary side 178*a* of a unique transformer 178 that will be described hereinafter in greater detail. The on-off action of power FETs 158 and 160 drives point 180 between 450 volts and ground. Capacitor 176 provides AC coupling for primary winding 178*a*. Capacitor 176, which is connected to ground, charges to the middle of the voltage swing at point 180 or to 225 volts. This effectively causes an AC voltage to be impressed on primary winding 178*a* that varies between 0 to 225 to 450 volts. The diodes 172 and 174 are very fast and respectively serve to protect the FETs 158 and 160 from any inductive kick that results from abrupt voltage changes in the primary winding 178*a* caused by the power FETs shutting off.

Transformer 178 is an over-wound, current limiting type. When primary 178*a* turns on, transformer action causes voltage to be induced in secondary windings 178*b*, 178*c*, 178*d* and 178*e*. The voltage developed across secondary winding 178*d* during normal, steady state operation is approximately 280 volts rms. The main power for lamps 4*a* and 4*b* comes from secondary winding 178*d*. Secondary windings 178*b*, 178*c* and 178*e* provide voltage to the lamp filaments 182, 184, 186 and 188. The secondary filament voltage developed by windings 178*b*, 178*c* and 178*e* is 5 volts rms. As shown in FIG. 2, secondary winding 178*b* is connected to filaments 184 and 186, secondary winding 178*c* is connected to filament 182 and secondary winding 178*e* is connected to filament 188.

At start-up, because it's over-wound, secondary winding 178*d* goes to approximately 470 volts rms, a voltage level that is needed to ignite the lamps and cause ionization of their internal gas. At the same time, secondary windings 178*b*, 178*c* and 178*e* provide approximately 9 volts to the filaments. As previously noted for start-up, the drive frequency is at its maximum value. At start-up, each of the capacitors 190, 192 and 194 can be considered as shorted and the result is that the voltage across the lamps from secondary winding 178*d* is at a maximum to help ionize the gas within the lamps and cause gentle lamp ignition. Operating frequency is then at its highest possible value for the control circuit portion and secondary 178*d* current is at its lowest value, holding the filaments at an elevated voltage level which warms the lamps and helps get them started by promoting electron flow from the filaments.

Since gas discharge lamps are easier to ionize at higher frequencies, the start voltage profile presented to the lamps promotes what is called a "soft start." The starting voltage for the lamps is predetermined to be at an initial frequency of 100 KHz which is swept down to the operating frequency of a non-dimming ballast or to the frequency set point corresponding to the feedback provided by the dimming switch (not shown) and associated dimming circuitry. At the higher operating frequency, less current is drawn in the secondary and that means that less power is delivered to the lamps as a result of transformer 178 action. This "soft start" results in significantly reduced flickering and noise from the lamps during their start phase. In addition, the lower starting current reduces depletion of the phosphor on the sidewalls of the lamps thereby prolonging their life.

When the lamps 4*a* and 4*b* start to draw current, secondary coil 178*d* goes to approximately 280 volts, a selected value that's typical for T8 type gas discharge lamps (this value would be different for other types of gas discharge lamps), due to the current limiting nature of transformer 178. The other secondary winding voltages and the filaments they are connected to simultaneously drop to 5 volts for the same reason. The frequency starts decreasing to wherever the control point has been set at terminals 138 and 140.

Nominally, after start, secondary windings 178*b*, 178*c* and 178*e* are at 5 volts and stay at the level even as the frequency for control purposes drops. However, the filament voltages are now dependent on the impedance presented by capacitors 190, 192 and 194 to the respective filaments they are coupled to. The value of capacitors 190, 192 and 194 is to select capacitive values that will drop actual filament voltages to about 2.5 volts for full light or minimum control frequency or 5 volts at 10 percent light, which corresponds to almost the maximum control frequency since at low light levels it is important to apply full voltage to the respective filaments to keep the lamps internally heated and thereby avoid lamp flicker.

Figure 4A:
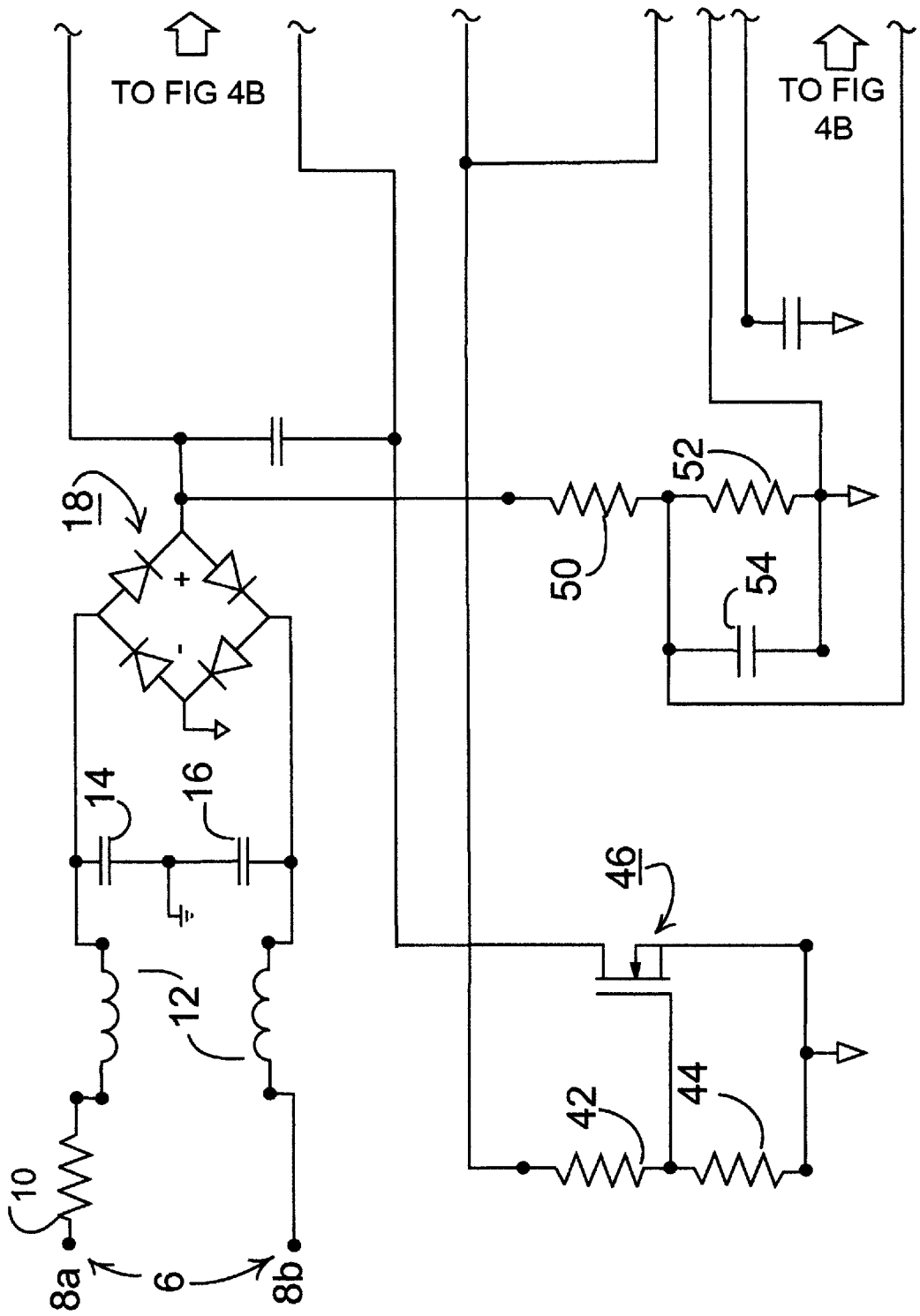
Figure 4B:
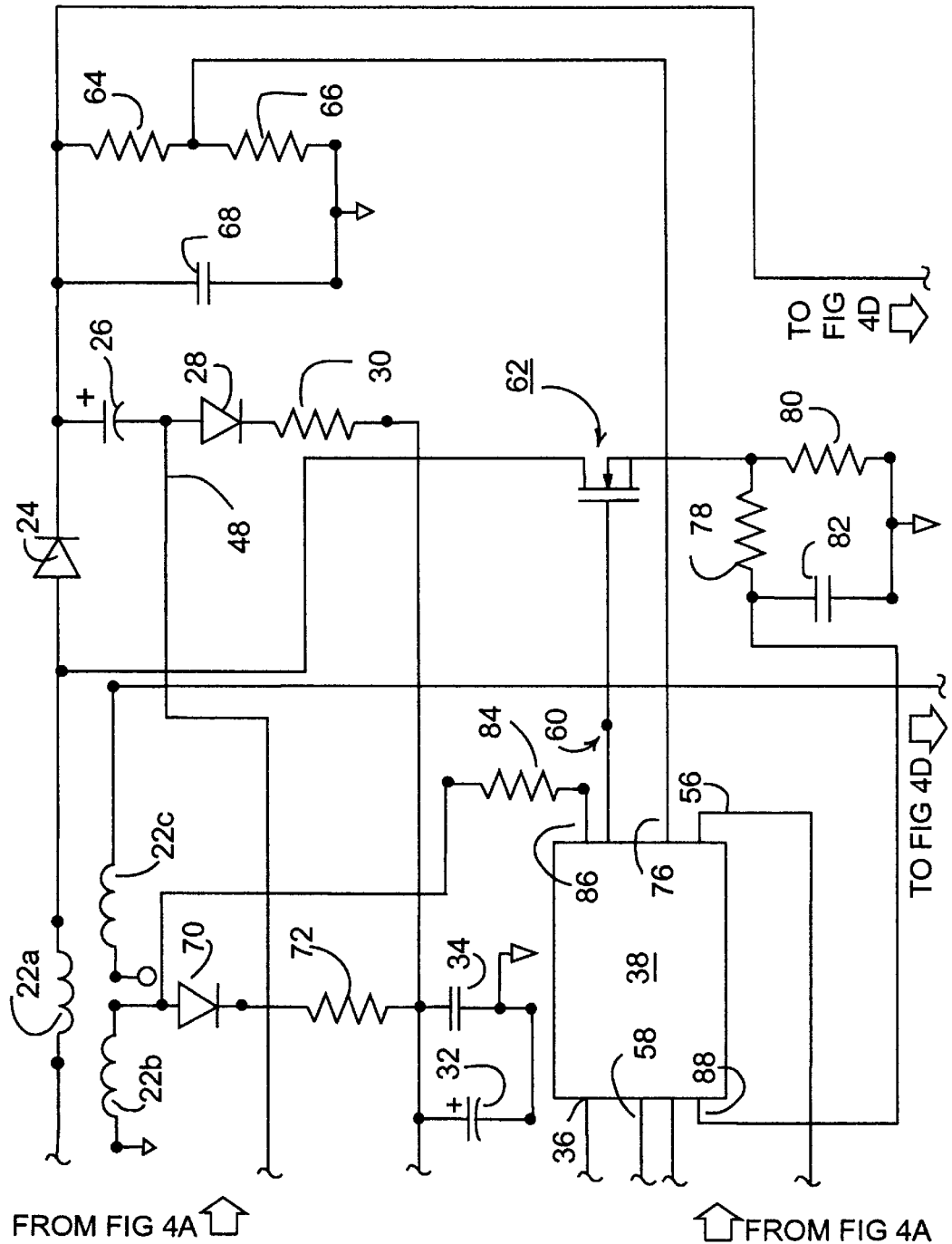
Figure 4C:
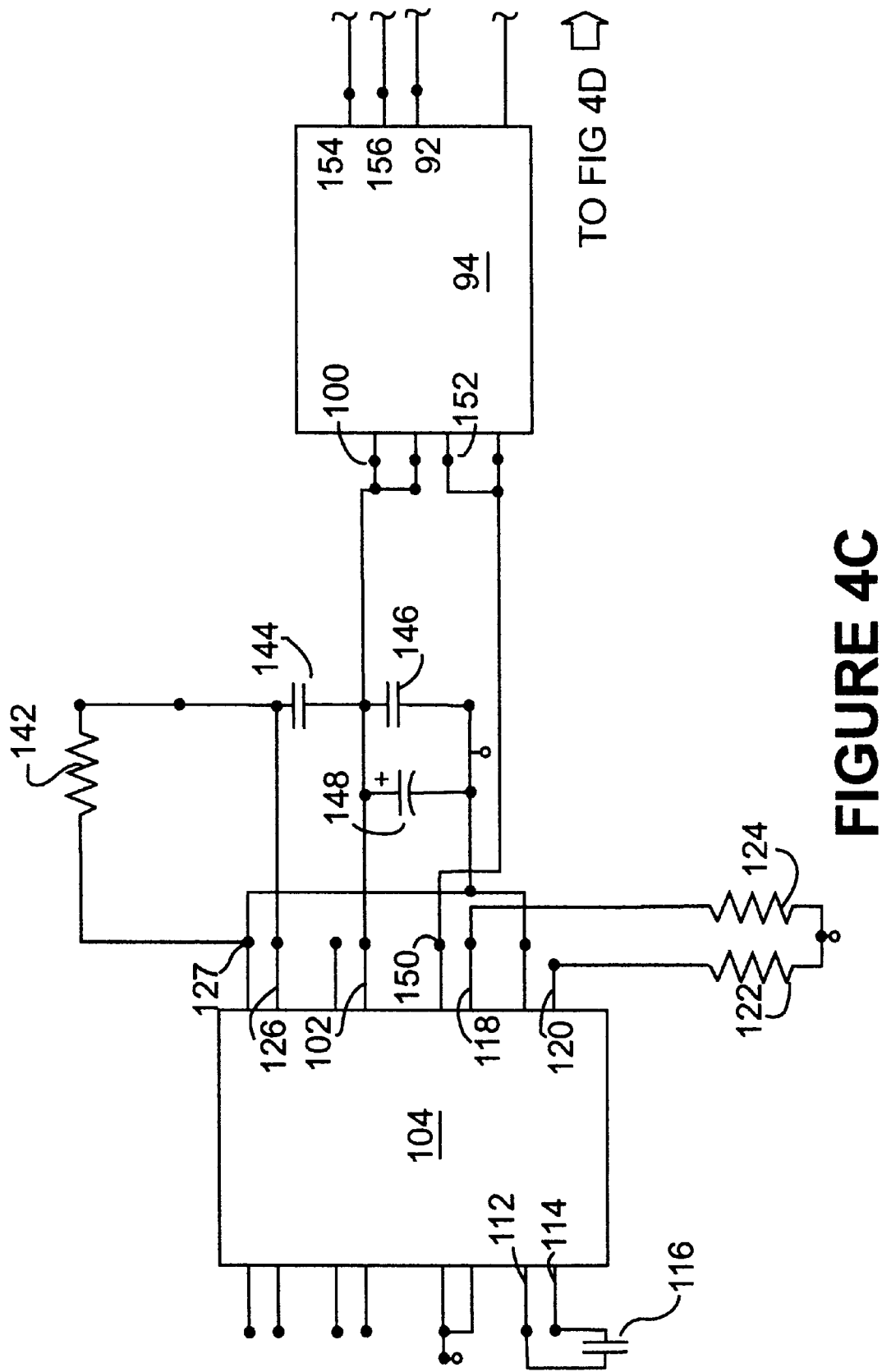

An equivalent, non-dimming electronic ballast 200 is shown in FIG. 4, i.e., FIG. 4A, FIG. 4B, FIG. 4C, and FIG. 4D, collectively. The power supply portion of the non-dimming version of ballast 200, is identical to the power supply portion of the dimming version of ballast 2 shown in FIG. 2. The control circuit portion, of the non-dimming version of ballast 200 functions the same as the control circuit portion of the dimming version in all respects, except as follows. Differential amplifiers 106 and 110 are removed from the control circuit of ballast 2 together with the set of matched resistors 128 and terminal 138 and 140, compare FIGS. 2 and 4, and specifically compare FIG. 2C with FIG. 4C and FIG. 2D with FIG. 4D. The end of resistor 142 that was connected to the output of differential amplifier 110 is removed therefrom and connected to input pin 127 of IC 104, compare FIGS. 2 and 4 once more. Pin 126 remains coupled between resistor 142 and capacitor 144 (FIG. 4C). At start, capacitor 144 is discharged, effectively a short, which pulls pin 126 to the top of its voltage range, insuring a maximum frequency output voltage on pin 150 to obtain the sweep in profile previously explained that the lamps favor. As capacitor 144 charges, the voltage to pin 126 eventually diminishes to its minimum value, and the frequency of the voltage at pin 150 drops linearly by the same percentage to the steady state operating frequency. As previously noted, the selected values of resistors 122 and 124 determine the maximum and minimum frequencies for the square wave voltage output on pin 150.

Figure 4D:
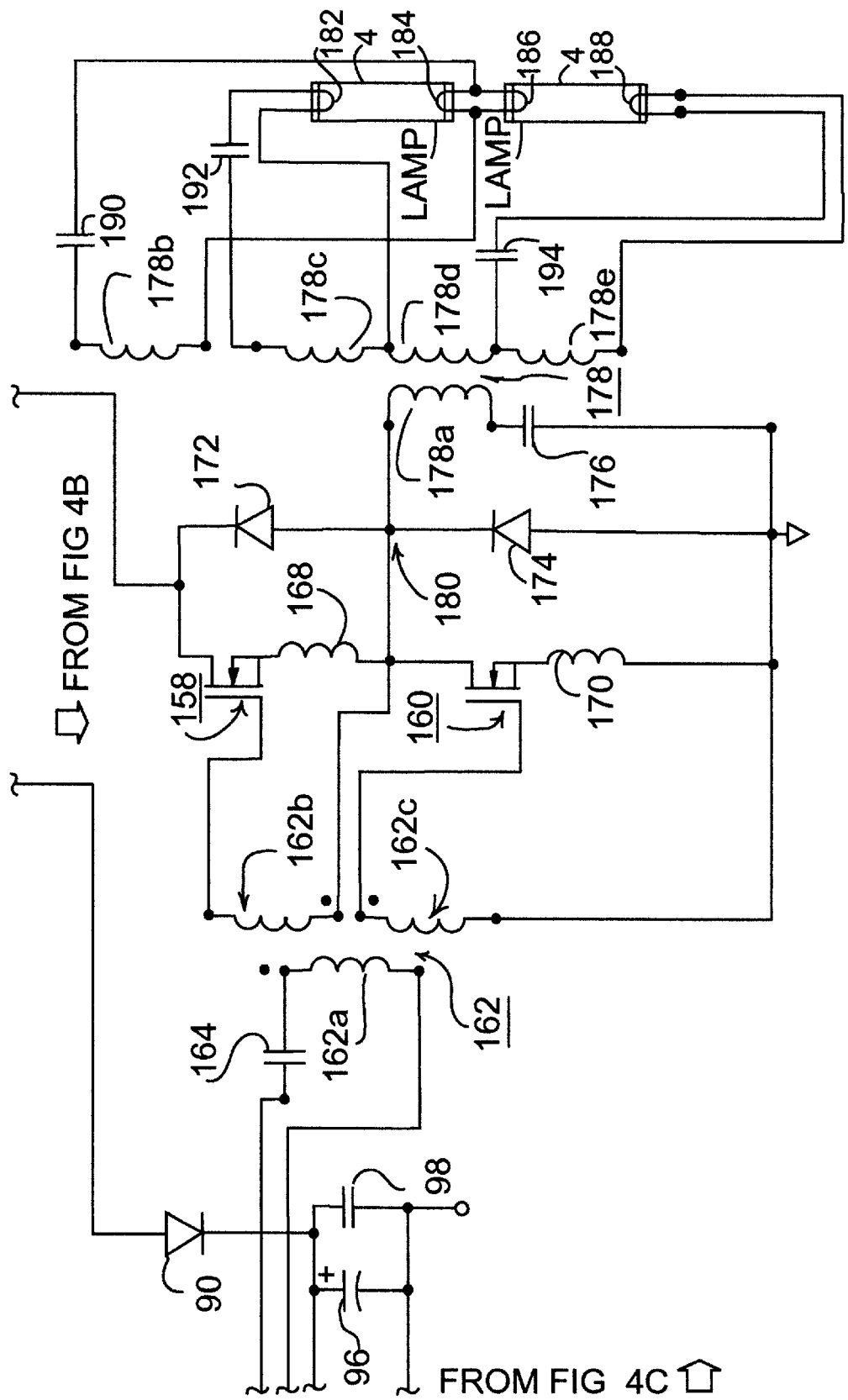

Also, in the non-dimming arrangement, the lamp current reference sensing circuit, comprising sensing coil 132, resistor 134 and diode 136, are also removed from the ballast 2 control circuit along with the lamp filament capacitors 190, 192 and 194, compare FIGS. 2D and 4D. The resultant non-dimming ballast 200 formed by removal of the above enumerated circuit elements and reconnection of resistor 142 directly to IC 104 is otherwise identical to dimming ballast 2.

Figure 5:
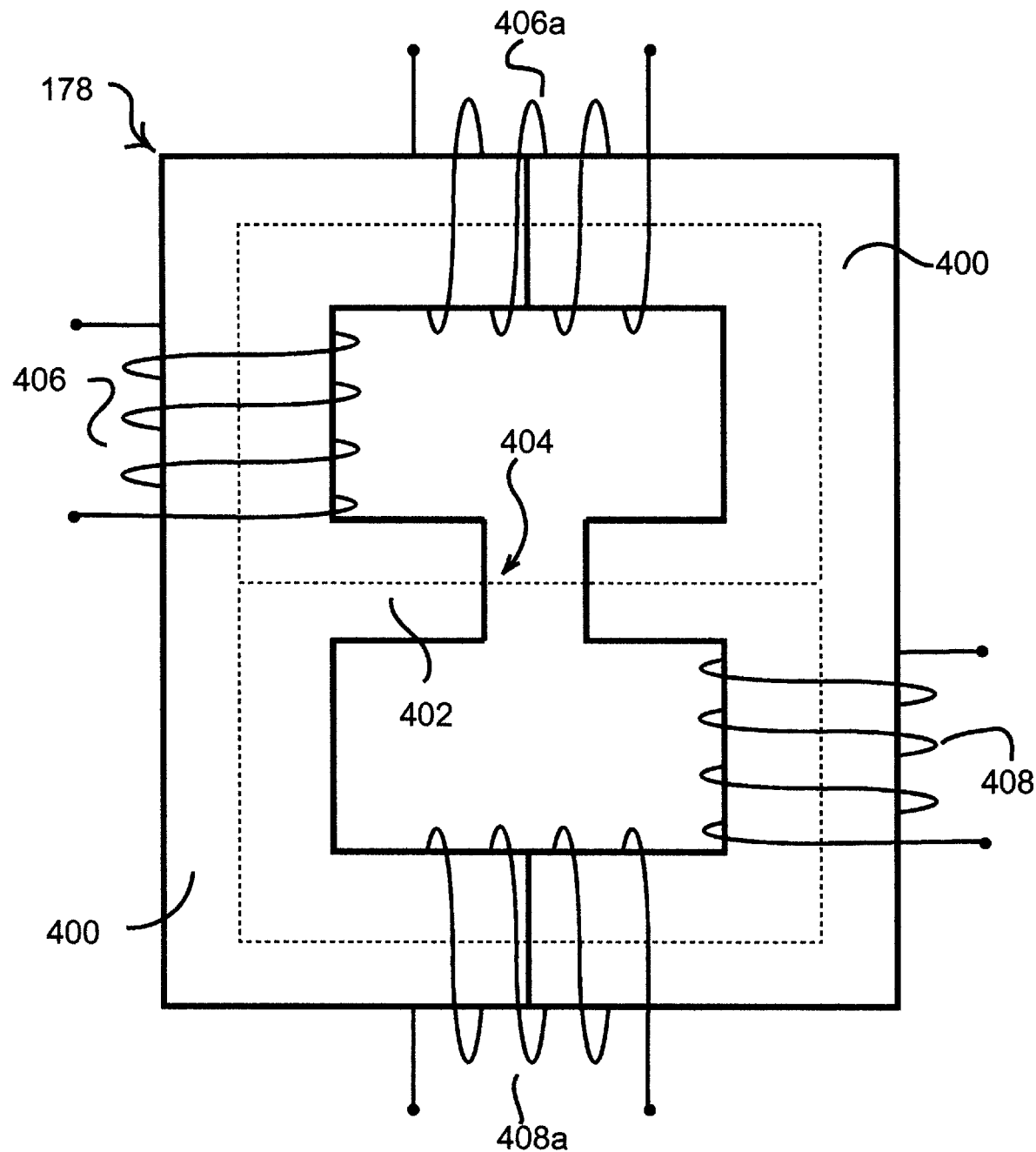
FIG. 5 illustrates a schematic diagram of a loosely coupled transformer of the type incorporated in the present invention.

Loosely coupled transformer 178 is a current transformer or device, see FIG. 5. The transformer is based on two facing E-shaped cores 400 provided with a shunt 402, having an air gap 404 therein, and primary and secondary windings 406 and 408, respectively. The gap width and material can be varied in accordance with the desired transformer operating characteristics. Further, primary and secondary windings can be placed respectively at alternate locations on core 400, in this example at locations 406a and 408a. The parameters of transformer 178 are selected to accommodate several performance factors including the power to be delivered to efficiently drive lamps 4, the open circuit voltage required to initially turn on lamps 4 and the lamp current crest factor (the ratio of peak lamp current to the rms lamp current) which should be kept below 1.7. In addition, because of its current limiting capabilities, a short circuit or high current demand situation on the secondary side of transformer 178 drops apparent power delivered by transformer 178 to secondary winding 406 by an approximate factor of 10. There is an equivalent reduction of input power to the ballast as well.

Further details of transformer 178 can be found in my commonly assigned, co-pending U.S. patent application Ser. No. 08/982,974, filed contemporaneously herewith, entitled FREQUENCY CONTROLLER FOR A LOOSELY COUPLED TRANSFORMER HAVING A SHUNT WITH A GAP AND METHOD THEREFOR.

The use of transformer 178, a frequency controlled, current limiting device, and the frequency control of the ballast are the keys in providing an improved ballast. Control is obtained by varying the voltage to input pin 126 of the voltage controlled oscillator chip 104 to produce an output drive voltage of essentially constant amplitude and variable frequency or holding the voltage (for a non-dimming version of the ballast) at a constant value that produces a voltage at a predetermined constant frequency. The net effect is that the current induced in the secondary side of transformer 178 is directly dependent on the frequency of the applied square wave. The use of such an arrangement limits current and voltage as a function of frequency and negates any need to employ pulse width modulation and its associated resonate circuit to clean up the voltage ripple. The present invention obviates that need while providing smoother, more efficient operating conditions.

It will be apparent to those of skill in the appertaining arts that various modifications can be made within the scope of the above invention. Accordingly, this invention is not to be considered limited to the specific examples chosen for purposes of disclosure, but rather to cover all changes and modifications which do not constitute departures from the permissible scope of the present invention. Having thus described my invention, what is desired to be secured and covered by Letters Patent is presented in the appended claims.

I claim:

1. An electronic ballast for supplying power to one or more gas discharge lamps comprising:

a) a rectifier circuit connecting the ballast to a source of AC power for converting received AC power to a form of DC voltage;

b) a voltage boosting circuit connected to receive the converted DC voltage for increasing the level thereof to the operating levels required by the lamps;

c) a control circuit connected between said boosting circuit and the lamps for controlling the application of boosted voltage to the lamps;

d) a power factor correction circuit for adjusting the power factor of the power drawn by the ballast close to unity, said power factor correction circuit connected to said rectifier circuit to receive the converted DC voltage and be turned on thereby in the first half cycle of operation and to said boosting circuit to turn it on and enable in-phase voltage boosting and the ballast once it has been started;

e) a voltage limiting and divider circuit connected between said rectifier circuit and said power factor correction circuit for maintaining the voltage applied to said power factor correcting circuit at a proper value regardless of the value of the AC voltage received by the ballast;

f) wherein said voltage limiting and divider circuit is adapted through selection of the values of its components to apply sufficient voltage to turn on said power factor correcting circuit at the value of the lowest value of AC voltage that could be received by the ballast;

g) an in-rush current limiting circuit connected to said voltage limiting and divider circuit for limiting the start-up current to said power factor correcting circuit to a predetermined appropriate level; and wherein said in-rush current limiting circuit is operationally bypassed by said voltage limiting and divider circuit once said voltage limiting and divider circuit reaches the proper value of voltage to be applied to said power factor correcting circuit.

2. The electronic ballast according to claim 1 wherein said voltage limiting and divider circuit comprises an electronic switch and associated circuit elements cooperating when power from said rectifier circuit is applied to the ballast to bias said switch from a non-conducting state to a conducting state and the values of said circuit elements are chosen so that the transition by said electronic switch to a conducting state occurs as soon as the voltage across said electronic switch reaches the minimum value required to power on said power factor circuit.

3. The electronic ballast according to claim 2 wherein said electronic switch is connected to said in-rush current limiting circuit in a manner that operationally removes said in-rush current limiting circuit when said transition by said electronic switch to a conducting state occurs.

4. An electronic ballast for supplying power to one or more gas discharge lamps comprising:

a) a rectifier circuit connecting the ballast to a source of AC power for converting received AC power to a form of DC voltage;

b) a voltage boosting circuit connected to receive the converted DC voltage for increasing the level thereof to the operating levels required by the lamps;

c) a control circuit connected between said boosting circuit and the lamps for controlling the application of boosted voltage to the lamps;

d) a power factor correction circuit for adjusting the power factor of the power drawn by the ballast close to unity, said power factor correction circuit connected to said rectifier circuit to receive the converted DC voltage and be turned on thereby in the first half cycle of operation and to said boosting circuit to turn it on and enable in-phase voltage boosting and the ballast once it has been started;

e) a voltage limiting and divider circuit connected between said rectifier circuit and said power factor correction circuit for maintaining the voltage applied to said power factor correcting circuit at a proper value regardless of the value of the AC voltage received by the ballast; and f) an in-rush current limiting circuit connected to said voltage limiting and divider circuit for limiting the start-up current to said power factor correcting circuit to a predetermined appropriate level.

5. The electronic ballast according to claim 4 wherein said in-rush current limiting circuit is operationally bypassed by said voltage limiting and divider circuit once said voltage limiting and divider circuit reaches the proper value of voltage to be applied to said power factor correcting circuit.

6. The electronic ballast according to claim 5 wherein said voltage limiting and divider circuit comprises an electronic switch receiving power from said rectifier circuit to bias said switch from a non-conducting state to a conducting state and the transition by said electronic switch to a conducting state occurs when the voltage across said electronic switch reaches a predetermined minimum value required to power on said power factor circuit.

7. The electronic ballast according to claim 6 wherein said electronic switch is connected to said in-rush current limiting circuit in a manner that operationally removes said in-rush current limiting circuit when the transition by said electronic switch to a conducting state occurs.

8. The electronic ballast according to claim 4 wherein said voltage limiting and divider circuit comprises an electronic switch receiving power from said rectifier circuit to bias said switch from a non-conducting state to a conducting state and the transition by said electronic switch to a conducting state occurs when the voltage across said electronic switch reaches a predetermined minimum value required to power on said power factor circuit.

9. The electronic ballast according to claim 8 wherein said electronic switch is connected to said in-rush current limiting circuit in a manner that operationally removes said in-rush current limiting circuit when the transition by said electronic switch to a conducting state occurs.

10. An electronic ballast for supplying power to one or more gas discharge lamps, each lamp having two lamp filaments, said ballast comprising:

a) a power supply circuit for receiving AC power, and converting it to a form of DC voltage;

b) a voltage boosting circuit connected to receive the converted DC voltage and supply a predetermined, constant reference voltage in response thereto;

c) a voltage controlled oscillator circuit connected to said voltage boosting circuit for generating an output signal whose frequency is a function of said received constant reference voltage;

d) a voltage regulating circuit connected to said voltage controlled oscillator circuit to receive its output signal and responsively generate a DC square wave output signal whose frequency is a function of the signal it receives; and e) a regulated transformer circuit connected to the lamps and to receive the output signal of said voltage regulating circuit, to transform the output signal from the voltage regulating circuit to an appropriate operating current for the lamps and to electrically isolate the lamps from the remainder of the ballast, wherein the operating current corresponds to the frequency of the output signal from the voltage regulating circuit and wherein the transformer circuit initially receives a relative high frequency output signal from the voltage regulating circuit causing the transformer to circuit to conduct a low current signal to the lamp to warm the lamp filaments, the transformer circuit subsequently receives a relatively lower frequency output signal from the voltage regulating circuit causing the transformer circuit to conduct a relatively high current to the lamp to ignite the lamp.

11. An electronic ballast for supplying power to one or more gas discharge lamps comprising:

a) a power supply circuit for receiving AC power, and converting it to a form of DC voltage;

b) a voltage boosting circuit connected to receive the converted DC voltage and supply a predetermined, constant reference voltage in response thereto;

c) a voltage controlled oscillator circuit connected to said voltage boosting circuit for generating an output signal whose frequency is a function of said received constant reference voltage;

d) a voltage regulating circuit connected to said voltage controlled oscillator circuit to receive its output signal and responsively generate a DC square wave output signal whose frequency is a function of the signal it receives; and e) a regulated transformer circuit connected to the lamps and to receive the output signal of said voltage regulating circuit, to transform the output signal from the voltage regulating circuit as a function of its frequency to an appropriate operating current for the lamps and to electrically isolate the lamps from the remainder of the ballast; and wherein said regulated transformer circuit includes a loosely coupled current limiting transformer having a shunt portion with a gap of suitable size and material.

12. The electronic ballast according to claim 11 wherein said gap of said loosely coupled, current limiting transformer is from 1 to 10 millimeters wide.

13. The electronic ballast according to claim 11 which additionally comprises a frequency adjusting circuit connected to said voltage controlled oscillator circuit for adjusting the frequency of said voltage controlled oscillator circuit's output signal as a function of the desired range of power to be applied to and operate the lamps.

14. The electronic ballast according to claim 13 wherein said gap of said loosely coupled, current limiting transformer is from 1 to 10 millimeters wide.

15. The electronic ballast according to claim 14 wherein the frequency adjusting circuit provides a high voltage at a relatively high frequency with relatively low current to start the lamps and a lower voltage at a relatively lower frequency and higher current to operate the lamps.

16. The electronic ballast according to claim 14 which additionally comprises a lamp current sensing circuit responsively associated with the lamps for determining the level of current flow through the lamps and generating a signal indicative thereof, an adjustable switching circuit settable to one point at a time in a permitted range of lamp brightness for generating a signal corresponding to the point of desired lamp brightness to which said switching circuit has been set and a comparator circuit, connected to said voltage controlled oscillator circuit, for comparing said sensed lamp current value and the switching circuit set point and for generating an adjustment signal as a function of the difference therebetween and for applying said adjustment signal to accordingly alter the reference voltage applied to said voltage controlled oscillator circuit.

17. An electronic ballast for supplying power to one or more gas discharge lamps, each lamp having a plurality of lamp filaments, said ballast comprising:

a) a rectifier circuit for connecting the ballast to a source of AC power, and for converting received AC power to a form of DC voltage;

b) a voltage boosting circuit connected to receive the converted DC voltage for increasing the level thereof to the operating levels required by the lamps;

c) a control circuit connected between the boosting circuit and the lamps for controlling the application of boosted voltage to the lamps;

d) a power factor correction circuit for adjusting the power factor of the power drawn by the ballast close to unity, said power factor correction circuit connected to said rectifier circuit to receive the converted DC voltage and be turned on thereby in the first half cycle of operation and to said boosting circuit to turn it on and enable in-phase voltage boosting and the ballast once it has been started;

e) a first voltage regulating circuit connected to receive the converted DC voltage and supply a predetermined, constant reference voltage in response thereto;

f) a voltage controlled oscillator circuit connected to said voltage regulating circuit for generating an output signal whose frequency is a function of said received constant reference voltage;

g) a second voltage regulating circuit connected to said voltage controlled oscillator circuit to receive its output signal and responsively generate a DC square wave output signal whose frequency is a function of the signal it receives; and h) a regulated transformer circuit connected to the lamps and to receive the output of said second voltage regulating circuit, to transform that signal as a function of its frequency to an appropriate operating current for the lamps and to electrically isolate the lamps from the remainder of the ballast wherein the transformer circuit initially receives a relative high frequency output signal from the second voltage regulating circuit causing the transformer to circuit to conduct a low current signal to the lamp to warm the lamp filaments, the transformer circuit subsequently receives a relatively lower frequency output signal from the second voltage regulating circuit causing the transformer circuit to conduct a relatively high current to the lamp to ignite the lamp.

18. The electronic ballast according to claim 17 which additionally comprises a voltage limiting and divider circuit connected between said rectifier circuit and said power factor correction circuit for maintaining the voltage applied to said power factor correcting circuit at a proper value regardless of the value of the AC voltage received by the ballast.

19. The electronic ballast according to claim 18 wherein said voltage limiting and divider circuit is adapted through selection of the values of its components to apply sufficient voltage to turn on said power factor correcting circuit at the value of the lowest value of AC voltage that can be received by the ballast.

20. The electronic ballast according to claim 19 which additionally comprises an in-rush current limiting circuit connected to said voltage limiting and divider circuit for limiting the start-up current to said power factor correcting circuit to a predetermined appropriate level.

21. The electronic ballast according to claim 20 wherein said in-rush current limiting circuit is operationally bypassed by said voltage limiting and divider circuit once said voltage limiting and divider circuit reaches the proper value of voltage to be applied to said power factor correcting circuit.

22. The electronic ballast according to claim 21 wherein said voltage limiting and divider circuit comprises an electronic switch and associated circuit elements cooperating when power from said rectifier circuit is applied to the ballast to bias said switch from a non-conducting state to a conducting state and the values of said circuit elements are chosen so that the transition by said electronic switch to a conducting state occurs as soon as the voltage across said electronic switch reaches the minimum value required to power on said power factor circuit.

23. The electronic ballast according to claim 22 wherein said electronic switch is connected to said in-rush current limiting circuit in a manner that operationally removes said in-rush current limiting circuit when the transition by said electronic switch to a conducting state occurs.

24. The electronic ballast according to claim 18 which additionally comprises an in-rush current limiting circuit connected to said voltage limiting and divider circuit for limiting the start-up current to said power factor correcting circuit to a predetermined appropriate level.

25. The electronic ballast according to claim 24 wherein said in-rush current limiting circuit is operationally bypassed by said voltage limiting and divider circuit once said voltage limiting and divider circuit reaches the proper value of voltage to be applied to said power factor correcting circuit.

26. The electronic ballast according to claim 25 wherein said voltage limiting and divider circuit comprises an electronic switch and associated circuit elements cooperating when power from said rectifier circuit is applied to the ballast to bias said switch from a non-conducting state to a conducting state and the values of said circuit elements are chosen so that the transition by said electronic switch to a conducting state occurs as soon as the voltage across said electronic switch reaches the minimum value required to power on said power factor circuit.

27. The electronic ballast according to claim 26 wherein said electronic switch is connected to said in-rush current limiting circuit in a manner that operationally removes said in-rush current limiting circuit when the transition by said electronic switch to a conducting state occurs.

28. The electronic ballast according to claim 18 wherein said voltage limiting and divider circuit comprises an electronic switch and associated circuit elements cooperating when power from said rectifier circuit is applied to the ballast to bias said switch from a non-conducting state to a conducting state and the values of said circuit elements are chosen so that the transition by said electronic switch to a conducting state occurs as soon as the voltage across said electronic switch reaches the minimum value required to power on said power factor circuit.

29. The electronic ballast according to claim 28 wherein said electronic switch is connected to said in-rush current limiting circuit in a manner that operationally removes said in-rush current limiting circuit when the transition by said electronic switch to a conducting state occurs.

30. The electronic ballast according to claim 17 wherein said regulated transformer circuit includes a loosely coupled, current limiting transformer having a gap of suitable size and material.

31. The electronic ballast according to claim 17 wherein said gap of said loosely coupled, current limiting transformer is from 1 to 10 millimeters wide.

32. The electronic ballast according to claim 31 wherein said regulated transformer circuit includes a loosely coupled, current limiting transformer having a shunt portion.

33. The electronic ballast according to claim 17 wherein said regulated transformer circuit includes a loosely coupled, current limiting transformer having a shunt portion.

34. The electronic ballast according to claim 17 which additionally comprises a frequency adjusting circuit connected to said voltage controlled oscillator circuit for adjusting the frequency of its output signal as a function of the desired range of power to be applied to and operate the lamps.

35. The electronic ballast according to claim 34 wherein the values of the circuit elements of said frequency adjusting circuit are selected to provide a high starting voltage frequency for the lamps and a lower operating voltage frequency.

36. The electronic ballast according to claim 34 which additionally comprises a lamp current sensing circuit responsively associated with the lamps for determining the level of current flow through the lamps and generating a signal indicative thereof, an adjustable switching circuit settable to one point at a time in a permitted range of lamp brightness for generating a signal corresponding to the point of desired lamp brightness to which said switching circuit has been set and a comparator circuit, connected to said voltage controlled oscillator circuit, for comparing the sensed lamp current value and the switching means set point and for generating an adjustment signal as a function of the difference therebetween and for applying said adjustment signal to accordingly alter the reference voltage applied to said voltage controlled oscillator circuit.

37. The electronic ballast according to claim 17 wherein said voltage controlled oscillator circuit is adapted to provide a high frequency output signal at start-up that ramps down to a lower frequency output signal at steady state lamp operation.

38. An electronic ballast for supplying power to one or more gas discharge lamps and their filaments comprising:
  a) a power supply circuit for receiving AC power, and converting it to a form of DC voltage;
  b) a first voltage regulating circuit connected to receive the converted DC voltage and supply a predetermined, constant reference voltage in response thereto;
  c) a voltage controlled oscillator circuit connected to said voltage regulating circuit for generating an output signal whose frequency is a function of said received constant reference voltage;
  d) a second voltage regulating circuit connected to said voltage controlled oscillator circuit to receive its output signal and responsively generate a DC square wave output signal whose frequency is a function of the signal it receives; and
  e) a regulated transformer circuit connected to the lamps and to receive the output of said second voltage regulating circuit, to transform that signal as a function of its frequency to an appropriate operating voltage for the lamps and an appropriate operating current for their filaments and to electrically isolate the lamps and their filaments from the remainder of the ballast wherein the transformer circuit initially receives a relative high frequency output signal from the second voltage regulating circuit causing the transformer to circuit to conduct a low current signal to the lamp to warm the lamp filaments, the transformer circuit subsequently receives a relatively lower frequency output signal from the second voltage regulating circuit causing the transformer circuit to conduct a relatively high current to the lamp to ignite the lamp.

39. The electronic ballast according to claim 38 wherein said regulated transformer circuit includes a loosely coupled, current limiting transformer having a gap of suitable size and material.

40. The electronic ballast according to claim 39 wherein said gap of said loosely coupled, current limiting transformer is from 1 to 10 millimeters wide.

41. The electronic ballast according to claim 40 wherein said regulated transformer circuit includes a loosely coupled, current limiting transformer having a shunt portion.

42. The electronic ballast according to claim 38 wherein said regulated transformer circuit includes a loosely coupled, current limiting transformer having a shunt portion.

43. The electronic ballast according to claim 38 which additionally comprises a frequency adjusting circuit connected to said voltage controlled oscillator circuit for adjusting the frequency of said voltage controlled oscillator circuit's output signal as a function of the desired range of power to be applied to and operate the lamps.

44. The electronic ballast according to claim 43 wherein the values of the circuit elements of said frequency adjusting circuit are selected to provide a high voltage at a relatively high frequency with relatively low current to start the lamps and a lower voltage at a relatively higher frequency and higher current to operate the lamps.

45. The electronic ballast according to claim 43 which additionally comprises a lamp current sensing circuit responsively associated with the lamps for determining the level of current flow through the lamps and generating a signal indicative thereof, an adjustable switching circuit settable to one point at a time in a permitted range of lamp brightness for generating a signal corresponding to the point of desired lamp brightness to which said switching circuit has been set and a comparator circuit, connected to said voltage controlled oscillator circuit, for comparing said sensed lamp current value and the switching circuit set point and for generating an adjustment signal as a function of the difference therebetween and for applying said adjustment signal to accordingly alter the reference voltage applied to said voltage controlled oscillator circuit.

46. The electronic ballast according to claim 38 wherein said voltage controlled oscillator circuit is adapted to provide a high frequency output signal at start-up that ramps down to a lower frequency output signal at steady state lamp operation.

47. An electronic ballast for supplying power to one or more gas discharge lamps and their filaments comprising:
  a) a rectifier circuit for connecting the ballast to a source of AC power, and for converting received AC power to a form of DC voltage;
  b) a voltage boosting circuit connected to receive the converted DC voltage for increasing the level thereof to the operating levels required by the lamps;
  c) a control circuit connected between the boosting circuit and the lamps for controlling the application of boosted voltage to the lamps;
  d) a power factor correction circuit for adjusting the power factor of the power drawn by the ballast close to unity, said power factor correction circuit connected to said rectifier circuit to receive the converted DC voltage and be turned on thereby in the first half cycle of operation and to said boosting circuit to turn it on and enable in-phase voltage boosting and the ballast once it has been started;

e) a first voltage regulating circuit connected to receive the converted DC voltage and supply a predetermined, constant reference voltage in response thereto;

f) a voltage controlled oscillator circuit connected to said voltage regulating circuit for generating an output signal whose frequency is a function of said received constant reference voltage;

g) a second voltage regulating circuit connected to said voltage controlled oscillator circuit to receive its output signal and responsively generate a DC square wave output signal whose frequency is a function of the signal it receives; and h) a regulated transformer circuit connected to the lamps and to receive the output of said second voltage regulating circuit, to transform that signal as a function of its frequency to an appropriate operating voltage for the lamps and an appropriate operating current for their filaments and to electrically isolate the lamps from the remainder of the ballast wherein the transformer circuit initially receives a relative high frequency output signal from the second voltage regulating circuit causing the transformer to circuit to conduct a low current signal to the lamp to warm the lamp filaments, the transformer circuit subsequently receives a relatively lower frequency output signal from the second voltage regulating circuit causing the transformer circuit to conduct a relatively high current to the lamp to ignite the lamp.

48. The electronic ballast according to claim 47 wherein said voltage controlled oscillator circuit is adapted to provide a high frequency output signal at start-up that ramps down to a lower frequency output signal at steady state lamp operation.

49. A method for supplying power to one or more gas discharge lamps comprising the steps of:

a) passing line voltage through a rectifier circuit connected to a source of AC power;

b) converting the received AC power to a form of DC voltage;

c) boosting the converted DC voltage to operating levels required by the lamps;

d) controlling the application of boosted voltage to the lamps;

e) generating a reference voltage in response to the converted DC voltage;

f) generating a frequency control signal having a frequency dependent on the reference voltage;

g) generating a lamp control signal having a frequency dependent on the frequency control signal; and h) applying the lamp control signal to a regulated transformer circuit connected to the lamps to conduct current to the lamps wherein the amount of current conducted to the lamps depends on the frequency of the lamp control circuit.

50. The method according claim 49 which comprises the additional step of providing another secondary portion of the regulated transformer circuit that is connected to the lamp filaments.

51. The method according to claim 49 wherein the frequency range of the control signal corresponds at startup to the highest frequency and lowest voltage appropriate for the lamps and at normal operating levels to the lowest frequency and highest voltage appropriate for the lamps.

52. The method according claim 51 which comprises the additional step of providing another secondary portion of the regulated transformer circuit that is connected to the lamp filaments.

53. An electronic ballast for softly starting a gas discharge lamp having lamp filaments, said ballast comprising:

a loosely coupled transformer having a primary winding and a secondary winding wherein the secondary winding provides power to the lamp;

a control circuit conducting an oscillating control signal to the primary coil of the loosely coupled transformer at a variable frequency wherein the oscillating control signal varies from a relatively high frequency to a relatively low frequency, the oscillating control signal causing the secondary coil of the transformer to conduct electrical current to the lamp, wherein the current conducted to the lamp depends on the frequency of the oscillating control signal and wherein the conducted current remains relatively low while the frequency of the oscillating control signal is relatively high to warm the lamp filaments and the conducted current remains relatively high when the frequency of the oscillating control signal is relatively low to start the lamp.

54. An electronic ballast as defined in claim 53 further comprising:

a rectifier circuit adapted to receive alternating-current (AC) power and to convert the AC power to a rectified voltage signal;

a voltage boosting circuit electrically connected to the rectifier circuit to receive the rectified voltage signal and boost the signal to a predetermined operating level;

the control circuit adapted to receive the boosted voltage signal from the voltage boosting circuit for controlling the application of boosted voltage to the lamps.

55. An electronic ballast as defined in claim 54 further comprising a voltage controlled oscillator adapted to receive an initial voltage signal from the voltage boosting circuit and to responsively conduct a high frequency control signal to the control circuit; the control circuit responsively conducting a high frequency oscillating control signal to the primary coil of the loosely coupled transformer.

56. An electronic ballast as defined in claim 55 wherein the voltage controlled oscillator reduces the frequency of the control signal conducted to the control circuit causing the control circuit to conduct a relatively lower frequency oscillating control signal to the loosely coupled transformer to increase the current provided to the lamp.

57. An electronic ballast as defined in claim 53 wherein a voltage controlled oscillator reduces the frequency of a control signal conducted to the control circuit causing the control circuit to conduct a relatively lower frequency oscillating control signal to the loosely coupled transformer to increase the current provided to the lamp.

* * * * *